United States Patent
Andersson et al.

(10) Patent No.: US 11,041,068 B2
(45) Date of Patent: Jun. 22, 2021

(54) SOLID SUPPORT

(71) Applicants: LIFE TECHNOLOGIES AS, Smestad (NO); THERMO FISHER SCIENTIFIC GENEART GMBH, Regensburg (DE)

(72) Inventors: Kristian Andersson, Rælingen (NO); Geir Fonnum, Fjellhamar (NO); Korbinian Heil, Munich (DE)

(73) Assignees: LIFE TECHNOLOGIES AS, Smestad (NO); THERMO FISHER SCIENTIFIC GENEART GMBH, Regensburg (DE)

( * ) Notice: Subject to any disclaimer, the term of this patent is extended or adjusted under 35 U.S.C. 154(b) by 176 days.

(21) Appl. No.: 16/305,372

(22) PCT Filed: Jun. 7, 2017

(86) PCT No.: PCT/EP2017/063879
§ 371 (c)(1),
(2) Date: Nov. 28, 2018

(87) PCT Pub. No.: WO2017/211913
PCT Pub. Date: Dec. 14, 2017

(65) Prior Publication Data
US 2019/0264017 A1 Aug. 29, 2019

(30) Foreign Application Priority Data
Jun. 8, 2016 (GB) ...................................... 1609983

(51) Int. Cl.
| | |
|---|---|
| *C08L 25/14* | (2006.01) |
| *C08L 25/08* | (2006.01) |
| *B01J 19/00* | (2006.01) |
| *C08F 212/08* | (2006.01) |
| *C08F 220/58* | (2006.01) |
| *C08F 293/00* | (2006.01) |

(52) U.S. Cl.
CPC ........... *C08L 25/14* (2013.01); *B01J 19/0046* (2013.01); *C08F 212/08* (2013.01); *C08F 220/58* (2013.01); *C08F 293/00* (2013.01); *C08L 25/08* (2013.01); *B01J 2219/005* (2013.01); *B01J 2219/00596* (2013.01); *B01J 2219/00722* (2013.01); *C08F 2800/20* (2013.01); *C08F 2810/20* (2013.01); *C08L 2312/00* (2013.01)

(58) Field of Classification Search
None
See application file for complete search history.

(56) References Cited

U.S. PATENT DOCUMENTS

| | | | | |
|---|---|---|---|---|
| 7,968,085 B2* | 6/2011 | Hersel | ...................... | B82Y 5/00 424/78.27 |
| 9,482,944 B2* | 11/2016 | Nguyen | ................ | C08F 220/50 |
| 2012/0041111 A1* | 2/2012 | Christensen | ......... | B01J 19/0046 524/111 |
| 2013/0210991 A1 | 8/2013 | Fonnum et al. | | |

OTHER PUBLICATIONS

Chapter 19 of Protocols for Oligonucleotides and Analogs, published by Humana Press, edited by Sudhir Agrawal, chapter by Richard T. Pon, pp. 465-496 (Year: 1993).*
De la Vega et al., "Uniform polymer microspheres: monodispersity criteria, methods of formation and applications" Nanomedicine vol. 8 No. 2 pp. 265-285 (Year: 2013).*
Beaucage, S. et al., "Advances in the Synthesis of Oligonucleotides by the Phosphoramidite Approach", Tetrahedron Report No. 309, vol. 48, No. 12, 1992, 2223-2311.
International Preliminary Report on Patentability for International Application No. PCT/EP2017/063879 dated Dec. 11, 2018, 8 pages.
International Search Report and Written Opinion for Application No. PCT/EP2017/063879, dated Sep. 19, 2018, 11 pages.
Ravikumar V T., et al., "UnyLinker: An Efficient and Scaleable Synthesis of Oligonucleotides Utilizing a Universal Linker Molecule: A Novel Approach to Enhance the Purity of Drugs," Organic Process Research and Development, vol. 12, No. 3, May 1, 2008 (May 1, 2008), pp. 399-410.

* cited by examiner

*Primary Examiner* — Eric Olson

(57) ABSTRACT

This invention relates to polymer particles for solid phase oligonucleotide synthesis. The oligonucleotide may be linked to the particle via a linker having an amide-oligoethyleneglycol-amine structure. The particles may be considered to act as a solid support during the oligonucleotide synthesis. Also disclosed are processes for preparing such polymer particles, compositions and systems comprising such particles, and uses thereof.

18 Claims, 10 Drawing Sheets

SOLID SUPPORT

This application is a National Stage 371 of PCT/EP2017/063879 filed Jun. 7, 2017, which claims the benefit of priority of GB 1609983.0 filed on Jun. 8, 2016, which disclosure are herein incorporated by reference in its entirety.

This invention relates to polymer particles for solid phase oligonucleotide synthesis, processes for preparing such polymer particles, compositions and systems comprising such particles, and uses thereof.

BACKGROUND

Since solid phase chemical synthesis was first invented in the 1960s, it has been widely used in peptide, oligosaccharide or oligonucleotide synthesis. In many instances, solid supports used in oligomer synthesis comprise porous μm-size microparticles with large surface to volume ratios. These particles may be obtained with various chemical activation groups suitable for use for different applications.

Many supports useful in the automated synthesis of oligonucleotides in the solid phase have been described in the literature. For example, the solid support may contain resin material or insoluble particles loaded into columns, reaction chambers or wells or layered between filter frits during the synthesis process.

Oligonucleotides are required for multiple purposes including biological or biophysical studies, biochemical processes or diagnostic or therapeutic applications. A solid support used in chemical oligonucleotide synthesis must fulfil certain requirements. It must be insoluble, chemically inert during the different reaction cycles and should possess limited swellability in the solvents used in the reaction cycles. In addition, the support should carry surface functional groups which allow coupling of a first nucleoside in a reproducible manner. Solid supports for oligonucleotide synthesis are typically provided either with a starter base or as universal support with a linker molecule that allows for conjugation of the first nucleoside during synthesis.

One of the standard particulate supports that fulfils these requirements is Controlled Pore Glass (CPG) characterized by efficient mass transfer, high chemical and thermal resistance and a high surface area and pore sizes ranging from 50 to 100 nm, wherein larger pore sizes allow for synthesis of longer molecules.

Another type of solid support routinely used in solid phase oligonucleotide synthesis is polymer particles composed of highly cross-linked polystyrene (Miyoshi et al., "Solid-phase synthesis of polynucleotides. II. Synthesis of polythymidylic acids by the block coupling phosphotriester method", Nucleic Acids Res. 1980, 8 (22) 5473-5490). Highly cross-linked polystyrene particles have certain advantages in terms of moisture exclusion properties and allow for efficient solid phase synthesis of oligonucleotides in small scale range.

Solid supports or particles used in oligonucleotide synthesis may be magnetic or non-magnetic. Magnetic particle technology is described e.g. in U.S. Pat. No. 5,512,439. Direct oligonucleotide synthesis on superparamagnetic particles using a Spacer 9 phosphoramidite (triethylene glycol) coupled to the hydroxylated surface of the particles is described e.g. in Jensen et al., J. Biotechnol. 2013, 20; 167(4).

In many instances, amine functionalised polystyrene particles have been used in organic phase synthesis. Such particles carrying surface amino reactive groups have been obtained by copolymerizing two or more vinyl-based monomers one of which carries a functional group that can be converted into an amine group or to which an amine group can be coupled after polymerization.

To avoid the extra step required to introduce amine functions after polymerization, improved methods have been developed allowing for direct incorporation of amine groups during the polymerization step. WO 01/70825 A1 describes a method of seeded suspension polymerization of vinylic monomers in the presence of aminostyrene and a cross-linking agent. WO 00/56790 A1 describes particles composed of a monovinyl monomer and one or more polyvinyl monomers which are polymerized in the presence of amino-vinyl aromatic monomers such as aminostyrene to incorporate surface functional amine groups into the resulting polyvinyl backbone via a link structure containing an arylene group. Lewandowski, K. et al. (J. App. Polymer Science, 1998, 67: 597-607) describe the polymerization of particles from mixtures of styrene and various substituted styrene monomers with divinylbenzene. All these methods result in monodisperse, porous amine functionalized particles with uniform distribution of amine groups.

Particles for oligonucleotide synthesis may be monodisperse, as the uniform nature of such monodisperse particles generally provides for uniform reaction rates particularly suited to synthesis in automated chemical synthesizers. Furthermore, such support matrixes are preferably porous with a large pore volume allowing for efficient loading of the particles with growing oligonucleotide chains. Macroporous particles may be obtained by controlling the degree of cross-linking of the polymer matrix and by including sufficient amounts of a porogen.

Although aromatic amine monomers such as aminostyrene have widely been used to functionalize solid support matrixes with amine groups, these compounds have a number of important limitations:

Firstly, the amine group in aminostyrene is aniline, where the amine is directly linked to an aromatic structure. Anilines are poor nucleophiles having an about 10 times lower reactivity than aliphatic amines, which makes subsequent reactions such as conjugation of linker molecules or a starter base or efficient capping of free amines more difficult.

Secondly, in aromatic amines, the amine group is located in close vicinity to the polymer main chain. In aminostyrene, the aniline is only approximately five bonds away from the polymer main chain nitrogen, which may further reduce the reactivity of those groups embedded in the polymer. The short distance between reactive groups and the polymer main chain may contribute to steric hindrance of oligonucleotide chains growing on the particle surface and within the pores thereby limiting the loading capacity and/or the length of an oligonucleotide to be synthesized.

Thirdly, although aromatic amines are widely used in industry for making dyes, pharmaceutical products, plastics, or as analytical or intermediates in many chemical synthesis processes, they are known for their toxicity and carcinogenic effects which drives the search for less hazardous compounds.

Fourthly, primary amine monomers are charged below pH 11-12, resulting in high water solubility. This means that it is difficult to incorporate amine monomers in particles formed in oil-in-water emulsions.

Fifthly, primary and secondary amine groups react with radical initiators, such as peroxide initiators, inhibiting radical initiated polymerization.

The poor nucleophilicity and detectability of free amines conferred by aromatic amines may be overcome by using amino vinyl aliphatic monomers in particle polymerization. An example for an aliphatic amine that is widely established in polymerization chemistry and well detectable by Kaiser test is vinylbenzene chloride (VCB) (see e.g. Dumistracel et al., "Poly(vinylbenzyl chloride) microsphere synthesis and their chemical modifications", J. Microencapsule, 2000, 17(1):45-550). Although this monomer offers some advantages over aromatic monomers, such as the possibility to introduce a variety of amines, VBC has certain constraints including a low efficiency of amine incorporation, limited reproducibility, and an extended polymerization process. In addition, VCB is classified as hazardous substance which limits its attractiveness in high volume industrial manufacturing.

Thus, there is a general need to develop an improved solid support for oligonucleotide synthesis that does not possess the above discussed limitations. One object of the current invention is therefore to provide porous, optionally monodisperse polymer particles that allow for efficient loading of molecules that serve as oligonucleotide synthesis substrate and optimal spacing between such molecules and particle surface. A further object of the invention is to provide a solid support that can be reproduced at equal quality and analysed according to standard tests. Another object of the invention is to provide a solid support that is stable under a wide range of reaction conditions. Another object of the invention is to provide a solid support that allows for increased production yields of long oligonucleotides. Yet another aim of the invention is to provide a solid support prepared with less toxic compounds.

SUMMARY OF THE INVENTION

The invention therefore relates, in part, to compositions and methods for preparing polymer particles with high loading capacity and stability for solid-phase oligonucleotide synthesis. It has been recognized that these objects can be met by incorporating an amine containing acrylamide monomer into the polymer matrix.

A first aspect of the present invention provides porous cross-linked polymer particles comprising a polymer formed from: at least one monovinyl monomer selected from a monovinyl styrene monomer and a monovinyl acrylate monomer; at least one polyvinyl monomer selected from a polyvinyl styrene monomer and a polyvinyl acrylate monomer; and at least one monomer of formula (I):

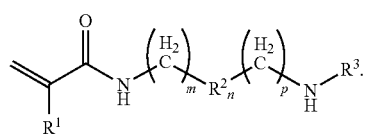

(I)

$R^1$ is selected from —H, —$CH_3$ and —$CH_2CH_3$. $R^2$ is selected from —$OCH_2CH_2$— and —$OCH_2CH_2CH_2$— or a combination thereof. $R^3$ is selected from —H, a protecting group and a linker, or a combination thereof. m is selected from 2, 3 or 4. n is an integer selected from 2 to 30. p is selected from 0, 1 and 2.

A second aspect of the present invention provides a method of forming porous cross-linked polymer particles, comprising:

forming an aqueous dispersion (a) of seed particles comprising an activating agent and allowing the activating agent to diffuse into the seed particles;

contacting the solution (a) with a solution (b) comprising at least one monovinyl monomer selected from a monovinyl styrene monomer and a monovinyl acrylate monomer, at least one polyvinyl monomer selected from a polyvinyl styrene monomer and a polyvinyl acrylate monomer, at least one monomer of formula (I), at least one porogen, and if required at least one initiator;

allowing the monomers to diffuse into the seed particles to form swollen seed particles; and activating the initiator and allowing polymerization to proceed. The monomer of formula (I) is defined as follows:

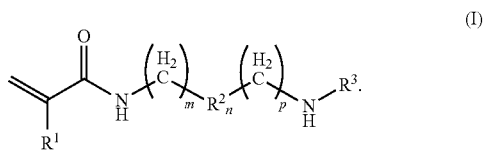

(I)

$R^1$ is selected from —H, —$CH_3$ and —$CH_2CH_3$. $R^2$ is selected from —$OCH_2CH_2$— and —$OCH_2CH_2CH_2$— or a combination thereof. $R^3$ is a protecting group. m is selected from 2, 3 and 4. n is an in integer selected from 2 to 30. p is selected from 0, 1 and 2.

A third aspect the invention provides cross-linked polymer particles obtainable by the second aspect. The cross-linked polymer particles may be obtained by a method disclosed herein.

A fourth aspect of the invention provides uses of the polymer particles for oligonucleotide synthesis.

A fifth aspect comprises a method of oligonucleotide synthesis, comprising synthesis of an oligonucleotide on polymer particles disclosed herein.

A sixth aspect provides for the use of cross-linked polymer particles disclosed herein for solid phase synthesis of nucleic acid molecules. The nucleic acid molecules may be oligonucleotides. The solid phase synthesis may be performed in wells of a microwell plate or a microchip. The solid phase synthesis may comprise an electrochemical or photochemical deblocking step. The nucleic acid may be synthesized at a yield of between 10 fmol and 10 pmol per particle (e.g. the yield may be between 50 fmol and 5 pmol, or between 100 fmol and 2 pmol).

An embodiment of the invention provides particles having the characteristics of particles obtained or obtainable by the methods disclosed herein; whilst such particles are obtainable by the processes described herein, they are characterized solely by their properties and not by their method of manufacture and, accordingly, the scope of protection of claims directed to particles specified by their characteristics is determined solely by the characteristics of the particles to the exclusion of their actual method of manufacture.

The products, compositions, methods and uses of the invention are not limited to the subject matter just mentioned but are, without limitation, described more fully in the following description and claims.

The invention will now be described further by reference to the following examples and figures. These are not intended to be limitative but merely exemplary of the invention.

BRIEF DESCRIPTION OF THE FIGURES

FIG. 1 shows the modification of monodisperse aminostyrene particles with linker molecules. FIG. 1A (ii) shows a 30 μm porous amine particle with linker; FIG. 1A (iii) shows a 30 µm porous amine particle with linker and capped.

FIG. 2 shows monodisperse particles functionalized with Boc-TOTA and processed to carry a UnyLinker™ for oligonucleotide synthesis.

DETAILED DESCRIPTION

Figure 1A:
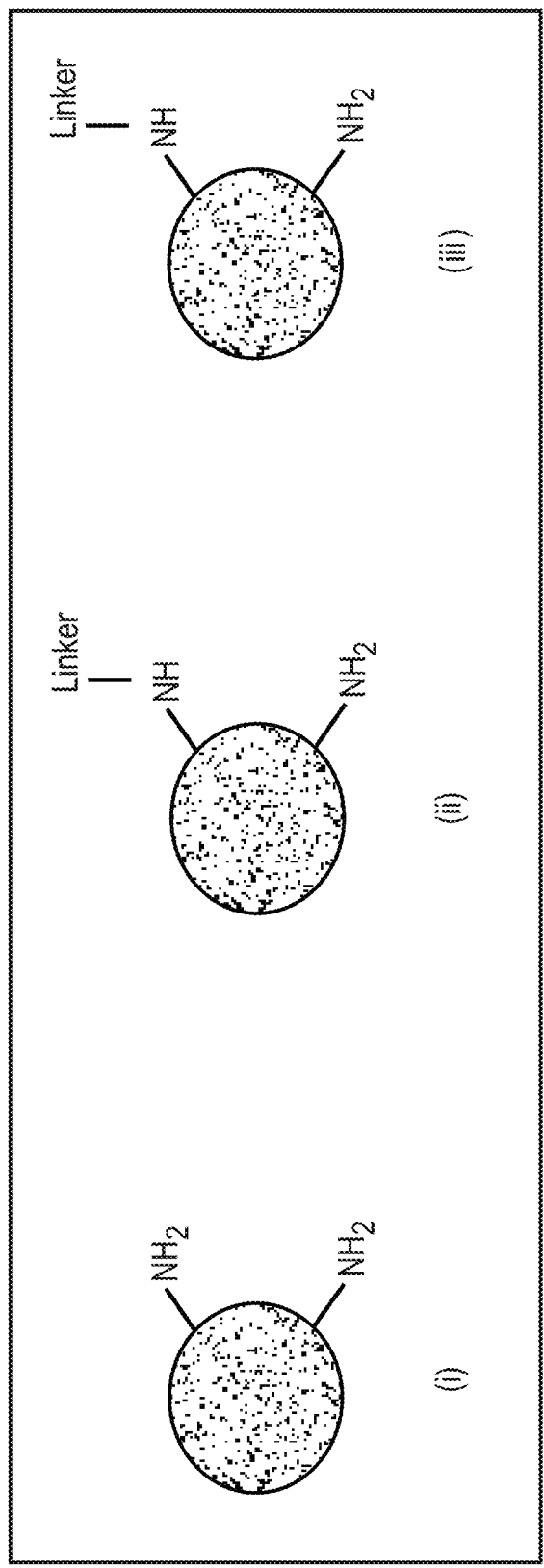
FIG. 1A (i) shows a 30 μm porous amine particle.
Figure 1B:
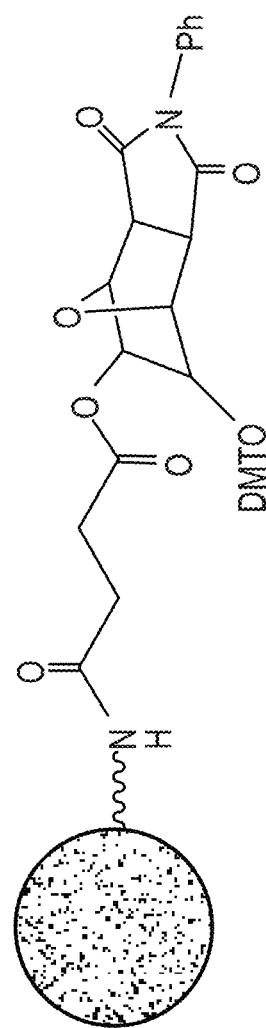
FIG. 1B shows a 30 µm porous amine particle with UnyLinker™.
Figure 2A:
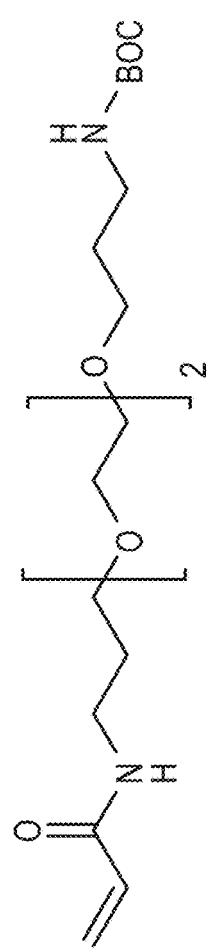
FIG. 2A shows the structure of Boc-TOTA and FIG. 2B shows the steps of deprotection, linker addition and capping of Boc-TOTA functionalized particles.
Figure 2B:
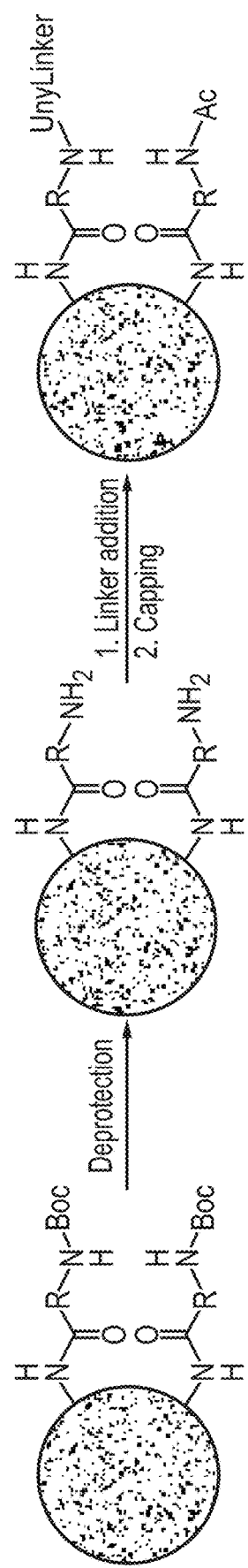

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

It will be appreciated that where an "about" is used prior to the temperatures, concentrations, amounts, times, numbers, coverage, etc. discussed in the present teachings, slight and insubstantial deviations are within the scope of the present teachings.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any embodiments disclosed herein. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

All publications, patent applications, patents, and other references mentioned herein are incorporated by reference in their entirety. In case of conflict, the present specification, including definitions, will control.

The present invention provides in an embodiment novel polymer particles and another embodiment provides a process by which the novel particles may be prepared. An embodiment provides novel seed particles for use in the process for forming the polymer particles and other embodiments provide methods of using the polymer particles which may be obtained by the process.

Definitions

The term "solid support" as used herein can have any one of a number of shapes such as spherical, particulate, oval, polygonal and the like. The solid support can have a smooth or porous or granular surface and may be a particle, including beads, particles, microparticles, nanoparticles and the like. For example, the solid support may comprise a polymeric particle or polymeric particles as disclosed herein. In some embodiments, the solid support is a monodisperse particle. The solid support may be a polymer particle such as e.g. a particle of the disclosure or a polystyrene particle. The support can have variable widths and sizes. For example, sizes of a particle which may be used in the practice of the invention are described elsewhere herein. The support can be hydrophilic or capable of being rendered hydrophilic and may be coated or equipped with binding entities. The support can be immobilized at an addressable position of a carrier such as a multiwell plate, a slide or a microchip. The support can be loose (such as, e.g., a resin material or a bead/particle in a well) or can be reversibly immobilized or linked to the carrier (e.g. by cleavable chemical bonds or magnetic forces etc.).

As used herein, the term "porous" means that the material or particle contains pores which may be of non-uniform or uniform diameters (for example in the nm range). In such porous materials, a reaction may take place within the pores.

The term "monodisperse" means that for a plurality of particles (e.g. at least 100, more preferably at least 1,000) the particles have a coefficient of variation (CV) or % polydispersity of their diameters of less than 20%, for example less than 15%, typically of less than 10% and optionally of less than 8%, e.g. less than 5%. The term monodisperse is used herein to characterize a population of particles or particles with low heterogeneity and a homogenous size distribution. The size distribution of a particle may be defined by the percentage CV (coefficient of variation) which may be determined on a CPS disc centrifuge as described in the Analytical Methods section herein. CV is defined as 100 times (standard deviation) divided by average where "average" is mean particle diameter and standard deviation is standard deviation in particle size. The CV for a plurality of particles may for example be within a range of 50 to 100%. For example, a monodisperse particle population may have more than 90%, preferably more than 95% of the particles with sizes within their mean diameter of ±5%.

Cross-linked polymer particles, for example particles of the invention formed from at least one monovinyl monomer, at least one polyvinyl monomer and a monomer of formula (I), may be formed using various methods known to the person skilled in the art. Exemplary methods include emulsion polymerisation and dispersion polymerisation. In a preferred polymer forming process described herein, the polymer particle forming process involves an oil-in-water emulsion, i.e. a discontinuous oil phase suspended in a continuous aqueous phase.

The polymer particle forming process described herein involves, therefore, two different particles, namely a seed particle which is subjected to a swelling and polymerization process to form a polymer particle. The terms "seed particle" and "polymer particle" are therefore used herein as follows:

"Seed particle" means, unless the context requires otherwise, a particle used as an intermediate in a polymer particle forming process. A seed particle is a polymeric particle that comprises non-cross-linked oligomers or polymers. Seed particles may be obtainable by emulsion polymerisation, for example according to a method disclosed in U.S. Pat. No. 4,186,120 or 7,217,762 B1. Large seed particles, e.g. seed particles with a diameter of >0.5 μm, may be formed by swelling smaller seed particles with monomers and polymerizing the monomers to form larger seed particles comprising non cross-linked polymer.

"Polymer particle" refers to a particle formed by polymerisation of monomers. A polymer particle may be made from the seed particle by suspension polymerization in accordance with a process described herein.

The term "oligonucleotide" as used herein refers to nucleotide multimers, either ribonucleotides (RNA) or deoxyribonucleotides (DNA), incorporating natural and non-natural nucleotides and may be composed of natural or synthetic nucleobases, or a combination of both. The backbone of the oligonucleotide can be composed entirely of "native" phosphodiester linkages, or it may contain one or modified linkages, such as one or more phosphorothioate, phosphoramidite or other modified linkages. As a specific example, an oligonucleotide may be a peptide nucleic acid (PNA), which contains amide interlinkages. Other examples include modified RNA nucleotides such as LNA (locked nucleic acid sequence) as described e.g. in Alexei et al., "LNA (Locked Nucleic Acids): Synthesis of the adenine, cytosine, guanine, 5-methylcytosine, thymine and uracil bicyclonucleoside monomers, oligomerisation, and unprecedented nucleic acid recognition", Tetrahedron, 1998, 54 (14): 3607-30. Common modified or synthetic nucleobases of which oligonucleotides may be composed include 3-methlyuracil, 5,6-dihydrouracil, 4-thiouracil, 5-bromouracil, 5-thorouracil, 5-iodouracil, 6-dimethyl amino purine, 6-methyl amino purine, 2-amino purine, 2,6-diamino purine, 6-amino-8-bromo purine, inosine, 5-methyl cytosine, 7-deazaadenine, and 7-deaza guanosine.

Oligonucleotides may have a length ranging from at least 2, or generally about 5 to about 200, or more commonly from about 20 to about 100 nucleotides. In embodiments, oligonucleotides may be at least 40 nucleotides and up to 300 nucleotides in length, or longer, e.g., up to 500 nucleotides in length. In addition, oligonucleotides may be nuclease resistant and include but are not limited to 2'-0-methyl ribonucleotides, phosphorothioate nucleotides, phosphorodithioate nucleotides, phosphoramidate nucleotides, and methylphosphonate nucleotides. Oligonucleotides may be synthetic and may be immobilized via their 5'- or 3'-terminal ends. Oligonucleotides may further comprise additional molecules (or atoms) that have been joined, either covalently or non-covalently. These additional molecules (or atoms) maybe attached to virtually any site on the oligonucleotide depending on downstream application.

With many oligonucleotide synthesis systems, synthesis efficiency decreases once the oligonucleotides reach certain lengths. Further, the lengths at which synthesis efficiency decreases can vary with synthesis parameters. One reason that synthesis efficiency is believed to decrease is due to steric hindrance effects. In particular, oligonucleotides are three dimensional compounds that occupy space. Thus, once the local space surrounding an oligonucleotide chain becomes limited, steric hindrance effects interfere with the addition of new bases to the molecule.

The invention includes compositions and methods for providing solid supports that allow for higher loading with growing oligonucleotide chains of 30, 40 or more nucleotides in length (e.g. at least 50 or at least 60 nucleotides in length) to lessen decreases in oligonucleotide related length synthesis efficiency.

The inventors have surprisingly found that amine containing acrylamide compounds represented by the formula

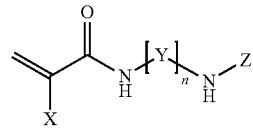

wherein X=H or $CH_3$,
Y=any combination of CH2, CH, CO, CS, C, O, NH, N, SO and/or S,
Z=H or a protecting group, and
n=2-20,
overcome the above specified limitations when used as monomer in the polymerization of polymer particles.

In some embodiments, the amine containing acrylamide compound may have the formula $C_{15}H_{32}N_2O_5$. In some embodiments, the acrylamide compound may be tert-Butyl (15-oxo-4,7,10-trioxa-14-azaheptadec-16-en-1-yl)carbamate, hereinafter referred to as "Boc-TOTA" with "Boc" representing the protective group coupled to the terminal amine group as indicated by the following structure (with amine groups shown in protected (top) and free (bottom) form).

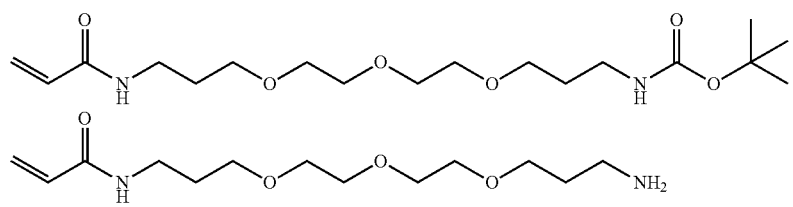

Other synonyms for Boc-TOTA are: tert-butyl (15-oxo-4,7,10-trioxa-14-azaheptadec-16-en-1-yl) carbamate or 6,9,12-Trioxa-2,16-diazanonadec-18-enoic acid, 17-oxo-, 1,1-dimethylethyl ester or tert-butyl (15-oxo-4,7,10-trioxa-14-azaheptadec-16-en-1-yl) carbamate.

Boc-TOTA has a spacer of fifteen atoms which exposes the reactive terminal amine group at a sufficient distance from the polymer surface to allow for efficient coupling of target molecules. The longer bridge will confer more space to coupled molecules such as oligonucleotides, thereby reducing the steric hindrance effects on adjacent reactions. Steric hindrance limits the growth of oligonucleotide chains on and in porous substrates wherein the coupling efficiency of bases decreases with increasing length of the oligonucleotide. The inventors have surprisingly found that Boc-TOTA particles provide oligonucleotides at both, high yield and high quality which renders them particularly suitable for large scale oligonucleotide production.

Although longer spacers may likewise be provided by other compounds such as PEG (meth) acrylates, PEG (meth) acrylate monomers are very water soluble and are therefore difficult to incorporate into a polymer in an oil-in water system, as the monomer will mainly stay in the water phase during suspension polymerization. In contrast, amine containing acrylamide compounds which are per se water soluble, can be rendered less hydrophilic by attachment of a hydrophobic protective group (such as Boc) based on which an efficient incorporation of the monomer into the polymer matrix can be achieved, thus leading to an improved polymerization reaction.

Another advantage of amine containing acrylamide compounds such as Boc-IOTA lies in the accessibility of exposed amine groups for efficient deprotection and capping reactions. Reactive amines can inhibit polymerization reactions and are therefore typically capped with protective groups during polymerization. To allow for subsequent coupling reactions (e.g. with a linker or a starter base for oligonucleotide synthesis) the protective group (e.g. the Boc group) needs to be removed. During this reaction, the easily accessible amine groups exposed on the surface and/or inside the pores of the polymer matrix will be deprotected more efficiently than the less accessible amine groups embedded in the polymer matrix, which will remain capped to a large extent. This has the advantage that following a coupling reaction (e.g. attaching a linker molecule) the remaining reactive amines of the polymer matrix which are mainly exposed on the polymer surface and/or within the pores of the matrix can be easily recapped (e.g. by a standard acetic anhydride capping reaction). Quantitative capping of the reactive amine groups is particularly critical during oligonucleotide synthesis where amidites could easily react with all uncapped amines of the polymer matrix. It is therefore desired that the polymer matrix itself is inert during the synthesis cycle and will not react with oligonucleotide building blocks or other components of the reaction mixture. Thus, by using polymer particles partly composed of acrylamide compounds such as Boc-TOTA, a high degree of recapping and thus quantitative protection during oligonucleotide synthesis can be achieved. In contrast, where a polymer matrix with more embedded free amine groups would be used (such as aminostyrene), any capping step after nucleotide coupling may not react fully with the internal, difficult to access amine groups which could then give rise to side reactions.

Furthermore, acrylamide compounds are stable and robust under a wide range of conditions which makes them particularly suitable for chemical oligonucleotide synthesis.

When compared to ester (PEG) monomers, amides such as Boc-TOTA are highly resistant to hydrolysis by acid or base and would therefore not be hydrolysed during a deprotection reaction which is a critical requirement during oligonucleotide synthesis. In contrast, esters are not stable towards hydrolysis conditions and may therefore hydrolyse during deprotection resulting in a loss of the functional group. Finally, Boc-TOTA has a low toxicity and may therefore offer a further route to high scale industrial and GMP manufacturing.

Polymer Particles

The invention provides polymer particles in an aspect and includes embodiments in which the polymer particles are monodisperse. For example, polymer particles formed in accordance with the methods of the disclosure may be monodisperse. Monodisperse particles provide advantages in a number of applications. For instance, the uniform nature of such monodisperse particles generally provides for uniform reaction rates particularly suited to synthesis in automated chemical synthesizers (e.g., oligonucleotide synthesizers). These particles may be obtained with various chemical activation groups suitable for use for different applications.

The use of monodisperse particles in various aspects of the invention helps ensuring that all particles are (1) substantially and homogenously contacted by synthesis reagents and (2) provides substantially equal loading capacity and (3) substantially equal amounts of reactive synthesis positions per synthesis unit, therefore assisting in the preparation of substantially equal starting conditions for parallel reactions.

The polymer particles may be porous cross-linked polymer particles comprising a polymer formed from at least one monovinyl monomer; at least one polyvinyl monomer; and a monomer of formula (I):

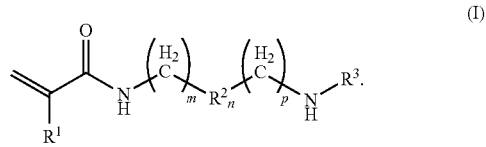

$R^1$ is selected from —H, —$CH_3$ and —$CH_2CH_3$. $R^2$ is selected from —$OCH_2CH_2$— and —$OCH_2CH_2CH_2$— or a combination thereof. $R^3$ is selected from —H, a protecting group and a linker, or a combination thereof. m is selected from 2, 3 or 4. n is an integer selected from 2 to 30. p is selected from 0, 1 and 2.

The at least one monovinyl monomer is a monovinyl monomer that may react in a radical reaction. The at least one monovinyl monomer may be a styrene monomer, an acrylate monomer, a methacrylate monomer, an acrylamide monomer or a methacrylamide monomer. The at least one monovinyl monomer may be a styrene monomer, an acrylate monomer or a methacrylate monomer. The at least one monovinyl monomer may be selected from a styrene monomer and an acrylate monomer. The at least one monovinyl monomer may be an acrylate monomer. The at least one monovinyl monomer may be a styrene monomer. The at least one monovinyl monomer may be styrene. The at least one monovinyl monomer may be at least two monovinyl monomers. The at least one monovinyl monomer may be one monovinyl monomer, e.g. styrene.

The at least one monovinyl monomer may comprise no hydroxyl, amine or amide groups. The at least one monovinyl monomer may comprise no hydroxyl groups. The at least one monovinyl monomer may comprise no amine groups. For example, the at least one monovinyl monomer may be selected from a monovinyl styrene monomer that comprises no hydroxyl, amine or amide groups and a monovinyl acrylate monomer that comprises no hydroxyl, amine or amide groups.

The at least one monovinyl monomer may be selected from one or more of . . . .

The at least one polyvinyl monomer is a polyvinyl monomer that may react in a radical reaction. The at least one polyvinyl monomer may be selected from a polyvinyl styrene monomer and a polyvinyl acrylate monomer. The at least one polyvinyl monomer may be a divinyl or a trivinyl monomer. The at least one polyvinyl monomer may be a divinyl monomer, e.g. diacrylate and/or diacrylamide and/or divinylbenzene such as a diacrylate and/or divinylbenzene. The at least one polyvinyl monomer may be divinylbenzene. The at least one polyvinyl monomer may be at least two polyvinyl monomers. The at least one polyvinyl monomer may be one polyvinyl monomer, e.g. divinylbenzene.

The at least one polyvinyl monomer may comprise no hydroxyl, amine or amide groups. The at least one polyvinyl monomer may comprise no hydroxyl groups. The at least one polyvinyl monomer may comprise no amine groups. For example, the at least one polyvinyl monomer may be selected from a polyvinyl styrene monomer that comprises no hydroxyl, amine or amide groups and a polyvinyl acrylate monomer that comprises no hydroxyl, amine or amide groups.

The at least one polyvinyl monomer may be selected from one or more of . . . .

$R^1$ may be selected from —H, —CH$_3$. $R^1$ may be —H. $R^1$ may be —CH$_3$. $R^2$ may be —OCH$_2$CH$_2$—.

m may be 2 or 3, e.g. m may be 2. n may be selected from 2 to 20, e.g. n may be selected from 2 to 10. n may be selected from 2, 3, 4, 5 or 6, e.g. n may be 2, 3 or 4. n may be 3. p may be 0 or 1, e.g. p may be 1.

At least one monomer of formula (I) may be a monomer of formula (II):

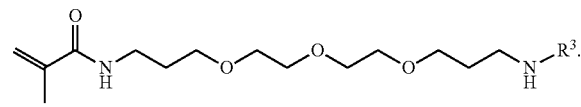

(II)

$R^3$ may be —H. $R^3$ may be a protecting group, e.g. an amine protecting group. $R^3$ may be a linker. $R^3$ may comprise a combination of a protecting group and a linker. Where $R^3$ comprises a combination of a protecting group and a linker, this means that for each polymer particle of (or group of polymer particles) some $R^3$ groups are a protecting group and other $R^3$ groups are a linker. For example, at least 0.5% (e.g. at least 1%, 5% or 10%) of $R^3$ groups may be a protecting group with the balance of $R^3$ groups being a linker. For example, at least 10% (e.g. at least 20%, 50% or 80%) of $R^3$ groups may be a linker group with the balance of $R^3$ groups being a protecting group.

The protecting group may be selected from tert-butyloxycarbonyl (Boc), carbobenzyloxy (Cbz), p-methoxybenzyl carbonyl (MeOZ), 9-fluorenylmethyloxycarbonyl (FMOC), acetyl (Ac), benzoyl (Bz), benzyl (Bn), carbamate, p-methoxybenzyl (PMB), 3,4-dimethoxybenzyl (DMPM), p-methoxyphenyl (PMP), and trichloroethyl chloroformate (Troc). The protecting group may be Boc.

The linker may be a linker as defined herein. The linker may be a universal linker. The linker may be a cleavable linker. The linker may be a succinyl linker. The linker may be UnyLinker™.

The linker may be a starter nucleoside, e.g. a starter phosphoramidite directly coupled to the amine of the particles. The linker may further comprise a starter nucleoside. The linker may further comprise an oligonucleotide.

The polymer particles may be monodisperse. The polymer particles may be monodisperse particles having a low coefficient of variation (CV), e.g. a CV which may be within a range of 1 to 10%, 1 to 20%, 1 to 30%, 1 to 30%, 3 to 20%, 5 to 15%, 2 to 10%, 10 to 25%, less than 10%, preferably less than 5% or less than 3%. The polymer particles may have a CV of less than 10%. The polymer particles may have a CV of less than 5%.

The polymer particles may have an average diameter according to the sizes disclosed herein. The polymer particles may have an average diameter of from 0.5 µm to 100 µm, e.g. of from 1 µm to 100 µm. The polymer particles may have an average diameter of from 10 µm to 50 µm.

The monomers may be present in the following relative amounts: at least one monovinyl monomer in an amount of from 20-89 wt %; at least one polyvinyl monomer in an amount of from 10-60 wt %; and at least one monomer of formula (I) in an amount of from 1-20 wt %. The monomers may be present in the following relative amounts: at least one monovinyl monomer in an amount of from 35-84 wt %; at least one polyvinyl monomer in an amount of from 15-50 wt %; and at least one monomer of formula (I) in an amount of from 1-15 wt %. The monomers may be present in the following relative amounts: at least one monovinyl monomer in an amount of from 50-78 wt %; at least one polyvinyl monomer in an amount of from 20-40 wt %; and at least one monomer of formula (I) in an amount of from 2-10 wt %.

The polymer particles may comprise a diameter of from 0.5 µm to 100 µm (e.g. from 1 µm to 100 µm), optionally from 10 µm to 50 µm, with a coefficient of variation of less than 10%, optionally less than 5%; and/or a surface area of from 200 m$^2$/g to 600 m$^2$/g (e.g. from 300 m$^2$/g to 500 m$^2$/g); and/or a porosity of from 60 to 80%, and/or a loading capacity of at least 40 µmol/g (e.g. at least 80 µmol/g), optionally at least 100 µmol/g, further optionally at least 200 µmol/g (e.g. at least 400 µmol/g).

The polymer particles may comprise an amine monomer content of from 2 mol % to 8 mol %. For example, the polymer particles may comprise an amine monomer content of from 3 mol % to 7 mol % (e.g. an amine monomer content of from 4 mol % to 6 mol %).

The polymer particles of the invention may be used in the synthesis of oligonucleotides. For example, polymer particles comprising a linker that comprise a starter nucleoside may be used (e.g. as a solid phase) in the synthesis of oligonucleotides. The polymer particles of the invention may be suitable for use in a conventional oligonucleotide synthesis method that comprises the use of phosphoramidite nucleosides. This oligonucleotide synthesis chemistry is performed in a non-aqueous system, for example in solvents such as acetonitrile and dichloromethane.

The monomers used to form the porous cross-linked polymer particles of the invention may therefore be selected to provide polymer particles that are compatible with this oligonucleotide chemistry. The at least one monovinyl monomer and/or the at least one polyvinyl monomer may comprise no hydroxyl, amine or amide groups. This may help ensure that the at least one monovinyl monomer and at least one polyvinyl monomer do not provide any residual nucleophiles in the polymer particles that may interfere in the phosphoramidite reaction. The at least one monovinyl monomer and/or the at least one polyvinyl monomer may comprise a log $P_{oct/wat}$ of at least about 0.2.

Sizes:

In certain embodiments, the particle is monodisperse as described herein, having, for example, an average particle diameter of about 1 μm to about 200 μm or about 5 μm to about 100 μm. In some embodiments, the particle size may be about 10 μm to about 50 μm or about 15 μm to about 40 μm. In specific embodiments the particle size may be between about 20 and about 35 μm or about 30 μm. In an embodiment, the particles may have an average diameter of not more than 40 μm, e.g. not more than 35 μm, optionally not more than 25 μm, as in the case of particles having a diameter of not more than 20 μm.

In specific embodiments of the invention, the particle size may be chosen depending on the size of a well of a microwell plate or the well of a microfluidic chip to allow only one single particle to occupy a well. In other embodiments, more than one particle may be in some or all of the wells. In some instances, the number of particles per well may be one, between two and twenty, between two and thirty, between two and ten, between four and twenty, between four and ten, between four and fifty, etc. In certain embodiments, the particle size may be chosen to accommodate one or more particles to a well of a multiwell plate or a microfluidic chip for synthesizing oligonucleotides thereon. For example, the diameter of a particle may be smaller than the diameter of a well by about 5% to about 20%, about 8% to 15%, or about 12.5%. In certain embodiments, the diameter of the monodisperse particle is about 32 μm, the diameter of each well is about 40 μl, and the depth of each well is about 55 μl. In certain instances, the diameter of a particle used in aspects of the invention will depend on the size of the well, whereas the size of a well may be defined by the dimension and/or density of a microfluidic chip. For example, a chip of a given size may have a higher number of smaller wells or a lower number of larger wells. Thus, a microchip of higher well density with smaller wells will require particles of smaller sizes than a chip of lower density with larger wells.

Porosity

The invention includes embodiments in which the particles are porous. Porous particles may be characterized by a specific pore volume, wherein, for example, 1 ml of pore volume per 1 gram of polymer is equal to 50% porosity. For example, a particle with a pore volume of 2.2 ml/g polymer has a porosity of 70%. Particle porosity depends on the polymer used and may be an important factor in achieving synthesis of nucleic acid molecules of a certain length. In certain instances the pore volume of a particle suitable for aspects of the invention may be within a range of 0.1 to 2.5 ml/g polymer. In certain embodiments the particle has a pore volume of between about 1.0 and about 2.0 ml/g of polymer. Exemplary percent porosities for cross-linked polystyrene having a density of 1.1 g/ml are indicated in Table 1 below. However, porosities may also be defined on a volume basis. Particle porosities that may be useful for certain aspects of the invention may be within a range of from about 50% to about 70%, from about 55% to about 65%, such as e.g. about 60%.

TABLE 1

| Exemplary porosity for polystyrene particles | |
|---|---|
| ml pore/g polymer | % porosity |
| 0.1 | 10 |
| 0.25 | 22 |
| 0.5 | 35 |
| 0.75 | 45 |
| 1.0 | 52 |
| 1.25 | 58 |
| 1.5 | 62 |
| 1.75 | 66 |
| 2.0 | 69 |
| 2.25 | 71 |
| 2.5 | 73 |

Surface Area

A polymer particle may be further defined by its surface area. In many instances, porous polymer particles with large surface to volume ratios may be used in aspects of the invention. The surface area of porous polymer particles can, for example, be determined according to a method developed by Brunauer, Emmett and Teller referred to as the BET method which is based on the physical adsorption of a vapour or gas onto the surface of a solid (Brunauer, S., Emmett, P. and Teller, E., J. Amer. Chem. Soc. 60 (1938), p. 309-319). This method uses dry particles for testing so, for accurate measurement, the pores should be of stable volume when exposed to solvents as compared to when dry. In some embodiments, the particle surface area may be within a range of 10 to 1000 $m^2/g$, between 100 and 700 $m^2/g$, between 200 and 600 $m^2/g$, between 300 and 400 $m^2/g$, such as e.g. about 350 $m^2/g$.

Amine Content

Reactive groups exposed on the surface of a polymer matrix may affect the particle loading capacity. A polymer particle functionalized for oligonucleotide synthesis may, for example, carry reactive amine groups and may be defined by its amine content. The amine content of a solid support may be expressed by weight % nitrogen per gram of polymer and may be within a range of 0.01 and 5%. In aspects of the invention, polymer particles may have an amine content of between 0.1% and 3%, between 0.15% and 0.5%, between 2% and 5%, between 0.5% and 1.5%, between 1.5% and 2%. Methods for elemental analysis to determine the weight % nitrogen and calculate amine content of solid supports (mol. amine per gram of support) are known in the art and may, for example, be calculated according to methods described by Dumas A. in Annales de chimie, 1826, 33, 342, or as further set forth by the US Environmental Protection Agency in method 440.0: Determination of Carbon and Nitrogen in Sediments and Particulates of Estuarine/Coastal Waters Using Elemental Analysis. In certain instances, the amine content may be about 1.8%, about 1.5%, about 1.2%, about 1.0%, about 0.8%, about 0.5%, about 0.25%, about 3%, about 3.5%, about 4% or about 5%. For example, in instances where Boc-TOTA is used as a monomer the amine content may be theoretically determined as indicated in Table 2 below and may be between about 2 and about 8 mole %.

TABLE 2

Exemplary analysis of amine content for particles containing Boc-TOTA

| weight % nitrogen/g | Mol amine/g particles | weight % Boc-TOTA/g particles |
|---|---|---|
| 0.01 | 3.57E−06 | 0.134 |
| 0.05 | 1.78E−05 | 0.667 |
| 0.1 | 3.57E−05 | 1.336 |
| 0.2 | 0.00007 | 2.621 |
| 0.5 | 0.00018 | 6.741 |
| 0.75 | 0.00027 | 10.111 |
| 1.0 | 0.00036 | 13.481 |
| 1.5 | 0.00054 | 20.222 |
| 1.8 | 0.00065 | 24.341 |
| 2.0 | 0.00072 | 26.963 |
| 2.5 | 0.00090 | 33.703 |
| 3.0 | 0.00107 | 40.069 |
| 3.5 | 0.00125 | 46.810 |
| 4.0 | 0.00144 | 53.925 |
| 5.0 | 0.00179 | 67.032 |

The skilled person will understand that the amine content of a polymer particle depends on the amine-containing compound or monomer used for polymerization. The amine content of a polymer particle may thus be adapted by using different amounts of an amine-containing monomer. For example, lower amounts of Boc-TOTA such as, e.g., less than 10 weight % or less than 5 weight % per gram of the total amount of monomers used in a polymerization mixture may be used to generate particles with a lower amine content.

Loading Capacity

Solid supports for oligonucleotides synthesis may be further characterized by their loading capacity. The loading capacity of a solid support defines the amounts of molecules that can be loaded onto a support and is therefore a determinant of the yields of oligonucleotides that can be synthesized per gram support. Loaded molecules may include linkers (e.g. a universal linker) or a starter base for oligonucleotide synthesis as further described herein, or may be generally referred to as oligonucleotide synthesis substrate. A polymer particle prepared according to methods of the invention may have a loading capacity of the oligonucleotide synthesis substrate within a range of 10 to 500 μmol/g, within a range of 20 to 200 μmol/g or within a range of 40 to 400 μmol/g or within a range of 50 to 100 μmol/g. In certain instances, the polymer particle may be characterized by a high loading capacity, e.g. a loading capacity of at least 80 μmol/g, at least 100 μmol/g, at least 150 μmol/g, at least 200 μmol/g, at least 250 μmol/g, or at least 300 μmol/g.

The length of an oligonucleotide that can be synthesized on a particle in quantitative amounts may to some extent depend on the loading capacity. The higher the loading of a support, the higher the overall yield of synthesized oligonucleotides will be. However, due to the steric hindrance effects discussed elsewhere herein, a high loading capacity may limit the length of an oligonucleotide that can be efficiently synthesized on a support. The higher the loading capacity the shorter the oligonucleotide that can be synthesized at sufficient quality. Thus, a polymer particle with a defined loading capacity may be chosen in view of the length of an oligonucleotide to be synthesized. The selection of a support with low loading capacity may in some instances allow for the production of longer oligonucleotides with low error rates (i.e. a higher percentage of correct full-length oligonucleotides), especially in the terminal region of the oligonucleotide synthesized late in the synthesis process.

For example, loading capacities of up to 100 μmol/g would typically allow for the synthesis of longer oligonucleotides of lengths within a range of about 30 to about 70 bases, whereas loading capacities of above 100 μmol/g would be used to synthesize shorter oligonucleotides of lengths within a range of about 10 to about 30 bases. However, the selection of matrix loadings may also depend on the chemistry of the synthesized molecules including type of nucleic acid (DNA, RNA) protective groups or base composition. Loading capacities that may be optimal to achieve synthesis of DNA oligonucleotides with standard bases of a certain length are indicated in Table 3.

TABLE 3

Target oligonucleotide length and suggested optimal linker loading capacity

| Length of DNA oligonucleotide | Linker loading capacity [μmol/g] |
|---|---|
| 4-20 | 250-350 |
| 20-30 | 100-250 |
| 30-40 | 70-100 |
| 40-60 | 50-70 |
| 60-80 | 35-50 |
| 0-200 | 35-15 |

Synthesis Yields

Factors which determine the amount of oligonucleotide which can be synthesized include surface area and size of the polymer particles upon which synthesis occurs. Thus, to some extent, particle parameters can be adjusted to alter the amount of oligonucleotide synthesized. Particles which may be used in the practice of the invention may vary in terms of size, including size ranges described elsewhere herein. In certain embodiments, the particles may have a diameter of between 20 μm and 40 μm, such as a diameter of between 30 μm and 35 μm. In certain embodiments, particles may be used which allow for an average amount of oligonucleotide to be produced in an amount from about 10 fmole to about 1.5 pmole (e.g. from about 100 fmol to about 1.5 pmol, or from about 500 fmol to about 1 pmol). In certain embodiments, polymer particles may be used that allow for the number of oligonucleotide molecules produced per particle to range from about $1\times10^9$ to about $1\times10^{13}$, such as, for example, $1\times10^{11}$ nucleic acid molecules. Table 4 illustrates the relationship between the number of oligonucleotide molecules the nanomolar amount of molecules that are present. These values can be arrived at by multiplying the number of nucleic acid molecules by $10^9$ and then dividing the result by Avagadro's constant.

TABLE 4

Number of molecules and corresponding nanomolar amounts

| Number of Oligonucleotide Molecules | Nucleic Acid (Nanomole) |
|---|---|
| $1.26 \times 10^5$ | $2.09 \times 10^{-10}$ |
| $3.14 \times 10^6$ | $5.22 \times 10^{-09}$ |
| $1.26 \times 10^7$ | $2.09 \times 10^{-08}$ |
| $1.13 \times 10^8$ | $1.88 \times 10^{-07}$ |
| $3.14 \times 10^8$ | $5.22 \times 10^{-07}$ |
| $1.26 \times 10^9$ | $2.09 \times 10^{-06}$ |
| $3.14 \times 10^{10}$ | $5.22 \times 10^{-05}$ |
| $1.26 \times 10^{11}$ | $2.09 \times 10^{-04}$ |
| $3.14 \times 10^{12}$ | $5.22 \times 10^{-03}$ |
| $1.26 \times 10^{13}$ | $2.09 \times 10^{-02}$ |

As one skilled in the art would understand, oligonucleotide synthesis substrate area directly reflects the number of oligonucleotide molecules which may be synthesized on that substrate. Table 5 below shows particle size, surface area calculations and an estimated number of oligonucleotide molecules that may be generated on the specified particles.

TABLE 5

Particle size, surface area and estimated No. of oligonucleotide molecules

| Particle Diam. (μm) | Surface Area (μm$^2$) | No. of Molecules |
|---|---|---|
| 1 | 3.14 | $1.3 \times 10^6$ |
| 5 | 78.5 | $1.62 \times 10^8$ |
| 10 | 314.16 | $1.7 \times 10^9$ |
| 30 | 2,827 | $6 \times 10^{10}$ |
| 50 | 7,853 | $2 \times 10^{11}$ |
| 100 | 31,415 | $1.8 \times 10^{12}$ |

Nucleosidic Polymer Particles

Nucleosidic solid supports (e.g., particle prederivatized with a "starter base") are widely used in automated oligonucleotide synthesis. One example of such a support is one where the 3'-hydroxy group of the 3'-terminal nucleoside residue is attached to the solid support via a 3'-O-succinyl arm. The use of nucleosidic solid supports requires usage of particles prederivatized with different types of bases (one for each base). For example, the synthesis of unmodified DNA requires four different types of nucleosidic polymer particles, whereas modified oligonucleotide analogues may require further supports loaded with modified nucleosides. The use of a specific nucleosidic solid support therefore depends on the sequence to be synthesized.

Linker

In certain instances, universal solid supports may be used. To make the solid support suitable for oligonucleotide synthesis (e.g. convert the solid support into a universal solid support), non-nucleosidic linkers or nucleoside succinates may be covalently attached to reactive amino groups. If necessary, however, other surface functions such as carboxyl, hydroxyl, or thiol, for example, could be used to attach a linker carrying a hydroxyl group or alternatively a 3'-attached nucleotide.

A nucleic acid molecule synthesized on a particle may be physically coupled to the particle by a linker. In certain exemplary embodiments, the linker, when present, may be a chemical entity that attaches the 3'-O of the nucleic acid molecule to the solid support (e.g., the linker may comprise a functional group on a solid support). In other exemplary embodiments, the linker, when present, may have a structure such that it allows for attachment of other functionalities in addition to the 3'-O. Such linker structures are disclosed, for example, in U.S. Pat. No. 7,202,264, and may be used according to certain embodiments disclosed herein. In most cases, the linker will be stable to all the reagents used during nucleic acid molecule synthesis, but cleavable under specific conditions at the end of the synthesis process. One linker commonly used in nucleic acid molecule synthesis is the succinyl linker.

A general structure for exemplary cleavable linkers is as follows, with the linker comprising the structure between the support and oligonucleotide:

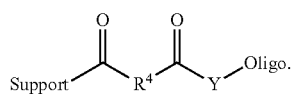

Where $R^4$ is an alkyl (e.g. $C_1$-$C_6$ alkyl or $C_2$-$C_4$ alkyl) or a polyethylene glycol chain (e.g. $(CH_2CH_2O)_rCH_2CH_2$, r is 2-12 or $(CH_2CH_2O)_2CH_2CH_2$) and Y is O or a molecule containing an easily hydrolysable group, for example UnyLinker™ has as Y ((3aR,4S,5R,7R,7aS)-5,6-dihydroxy-2-phenylhexahydro-1H-4,7-epoxyisoindole-1,3(2H)-dione)). For a particle or particles of the present invention as the support, the linker may be connected to the support via —NH—, in which case $R^3$ has formula (IIIa) or (IIIb):

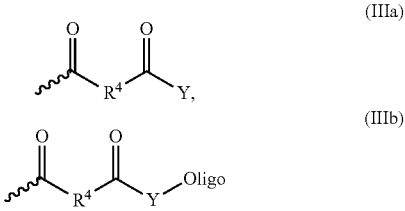

Where $R^4$ and Y are as defined elsewhere, and the bond with an —NH of the support is illustrated by a wavy line. Formula (IIIa) illustrates the support and linker without the oligonucleotide, while formula (IIIb) illustrates the support and linker with an oligonucleotide attached to the linker.

Typically, such linkers are based around dicarbonyl compounds for example succinates ($R^4$=$CH_2CH_2$) and are often attached to the solid support through a stable bond such as an amide. The oligonucleotide is bound to the linker via a labile bond that is stable during synthesis but cleaved under other conditions, such as an ester that can undergo basic hydrolysis (e.g. Y may be O). After synthesis of the oligonucleotide, it may be cleaved with or without a 3'-phosphate. For simple ester linkages (Y is O), cleavage will occur with the 3'-phosphate remaining on the oligonucleotide. Should a 3'-OH moiety be desired, the linker should contain a group that will react with the phosphate and liberate it from the sequence. This could entail Y being a larger molecule where the oligonucleotide is attached in such a manner that after ester hydrolysis, a five membered cyclic structure is formed with the 3'-phosphate and the oligo acting as a leaving group. For example, UnyLinker™ has Y group corresponding to ((3aR,4S,5R,7R,7aS)-5,6-dihydroxy-2-phenylhexahydro-1H-4, 7-epoxyisoindole-1,3(2H)-dione).

Figure 3A:
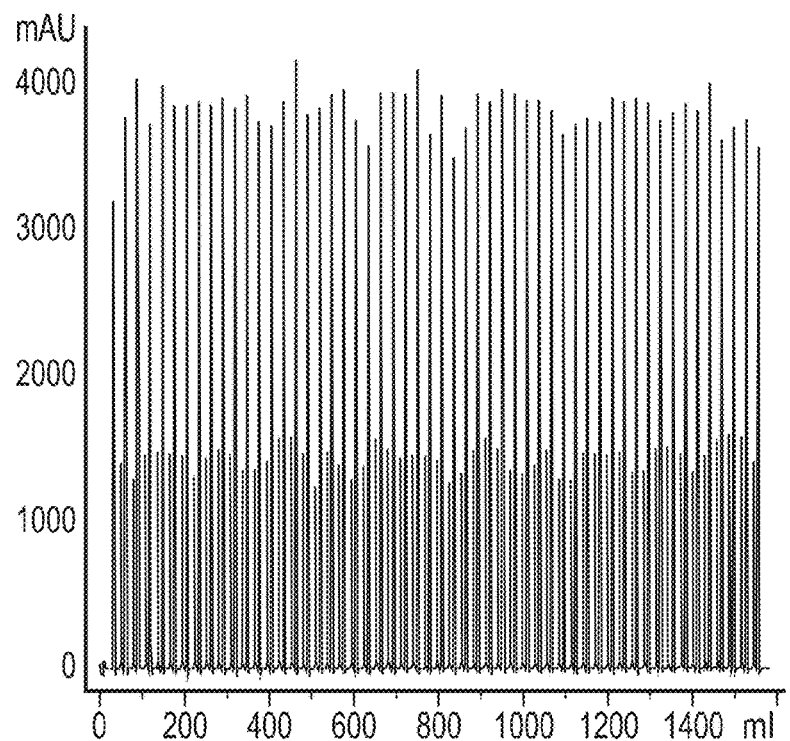
FIG. 3 shows detritylation (A) and HPLC data (B) of oligonucleotides synthesized on particle batch 1 prepared with 4% Boc-TOTA (104 µmol/g).
Figure 3B:
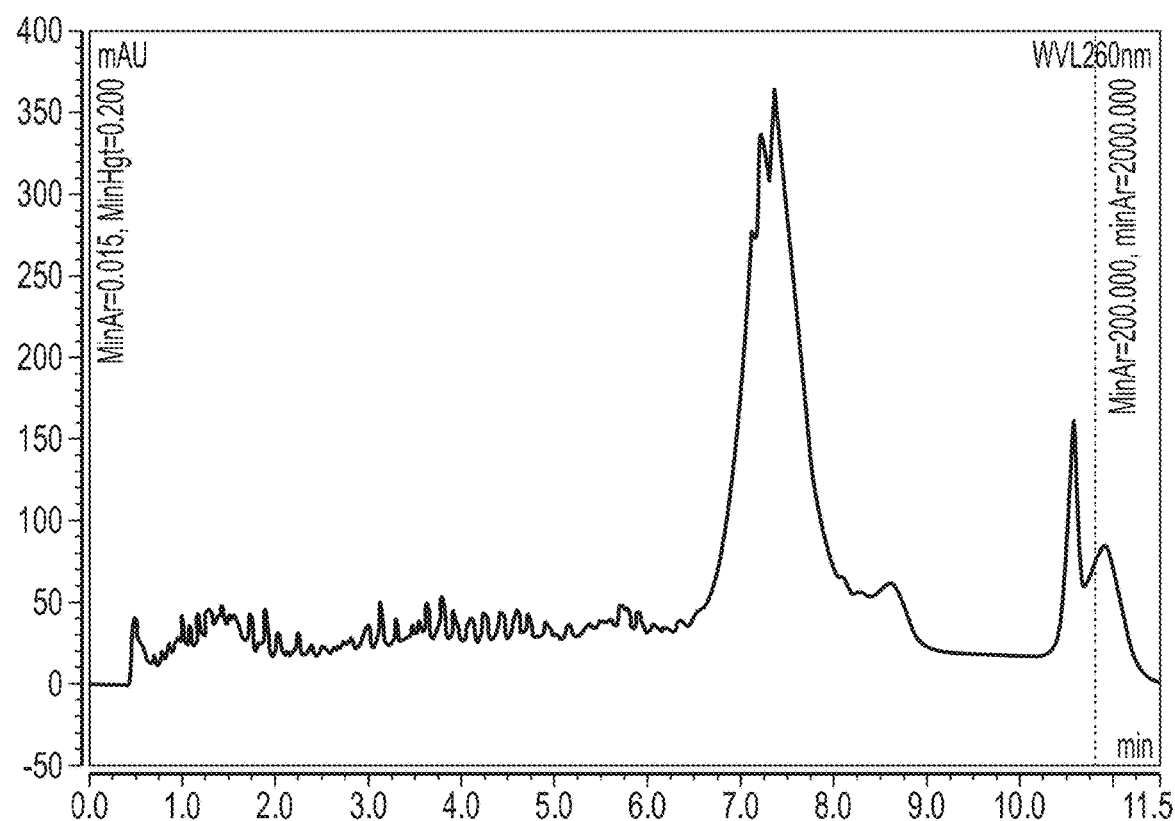
Figure 4A:
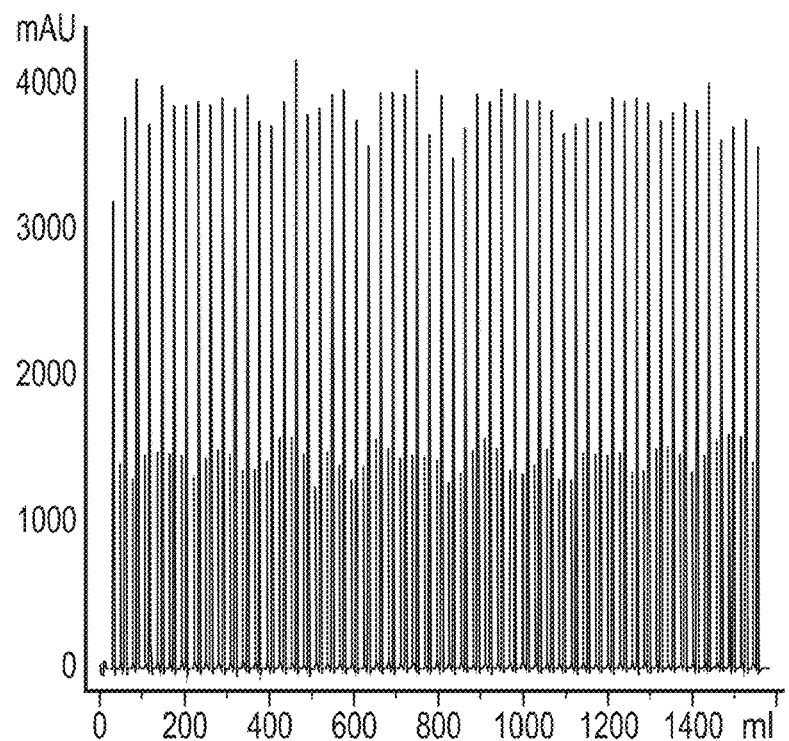
FIG. 4 shows detritylation (A) and HPLC data (B) of oligonucleotides synthesized on particle batch 2 prepared with 4% Boc-TOTA (95 µmol/g).
Figure 4B:
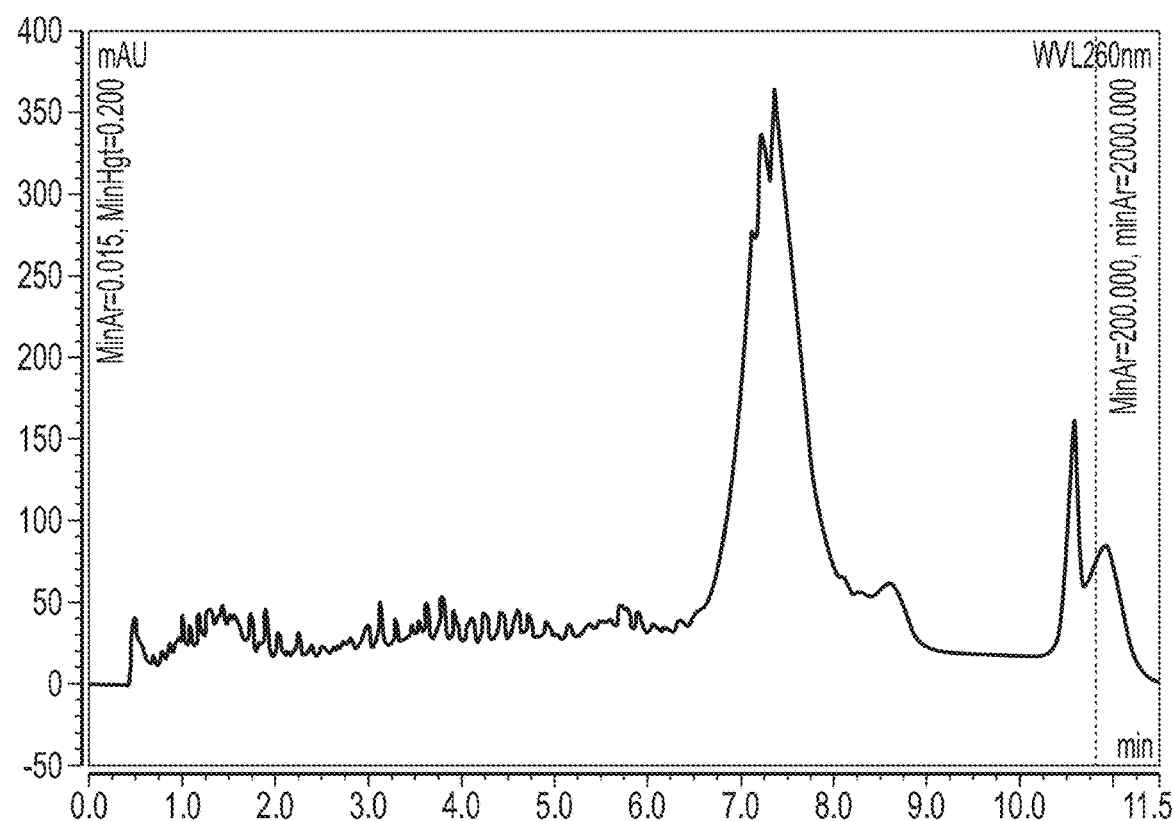
Figure 5A:
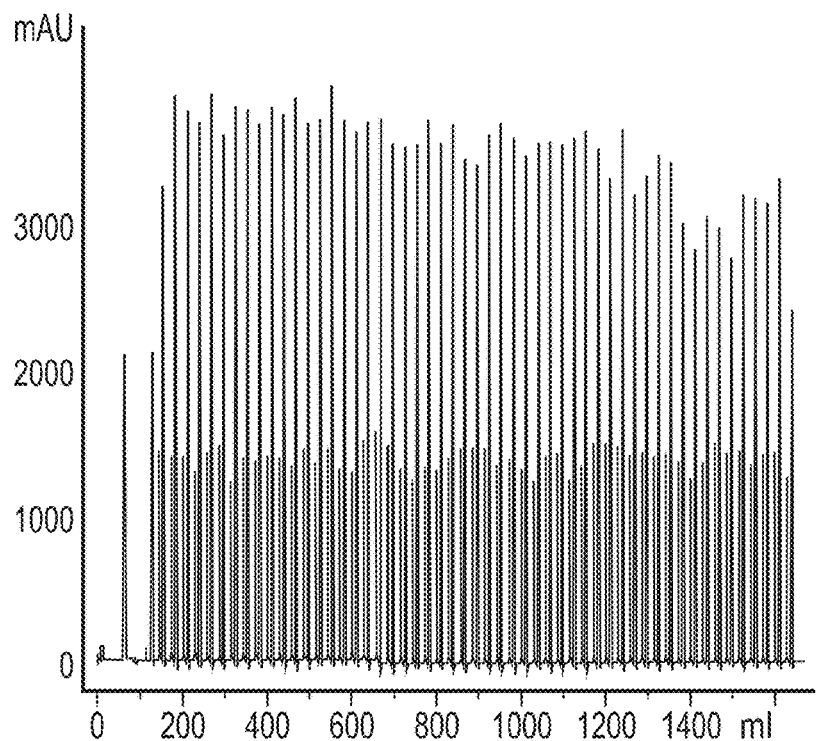
FIG. 5 shows detritylation (A) and HPLC data (B) of oligonucleotides synthesized on particle batch 3 prepared with 4% aminostyrene (56 µmol/g).
Figure 5B:
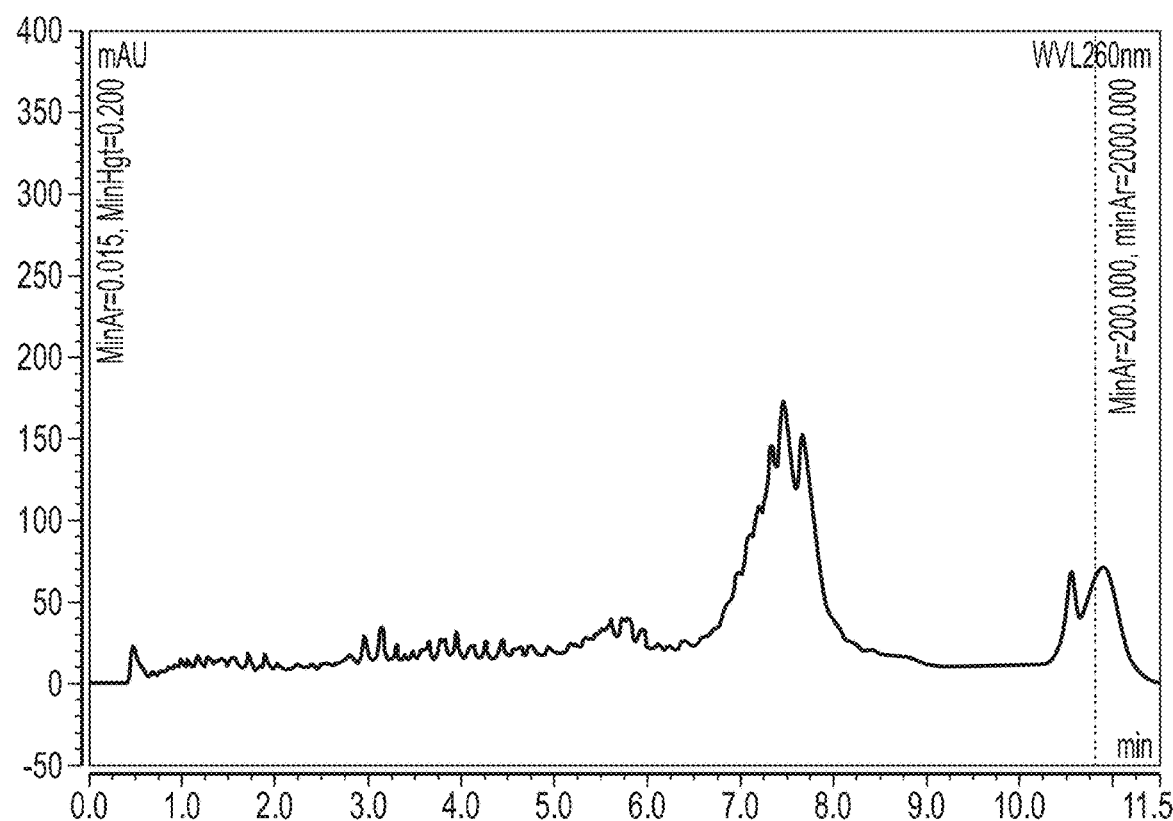
Figure 6A:
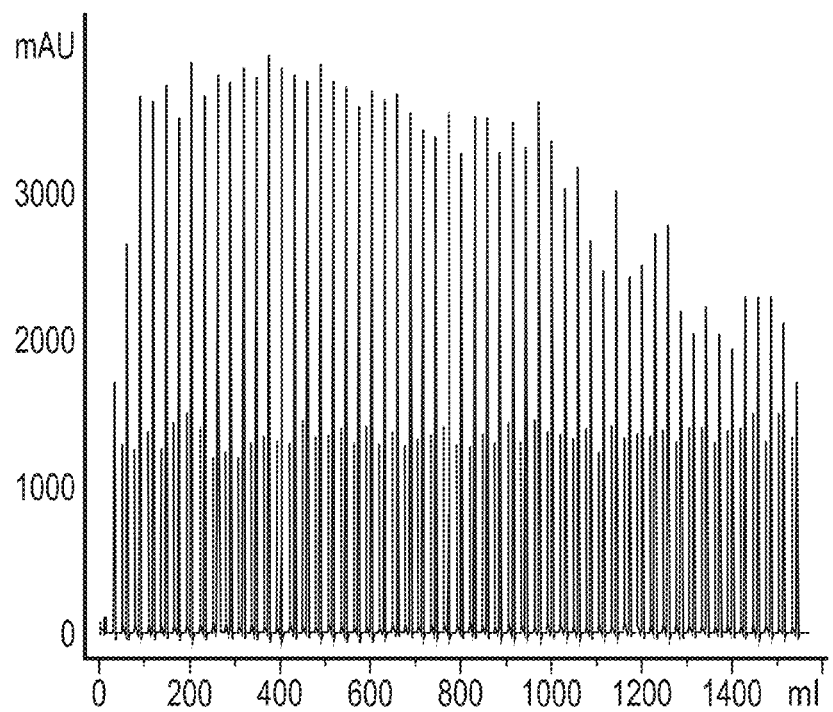
FIG. 6 shows detritylation (A) and HPLC data (B) of oligonucleotides synthesized on particle batch 4 prepared with 4% aminostyrene (67 µmol/g).
Figure 6B:
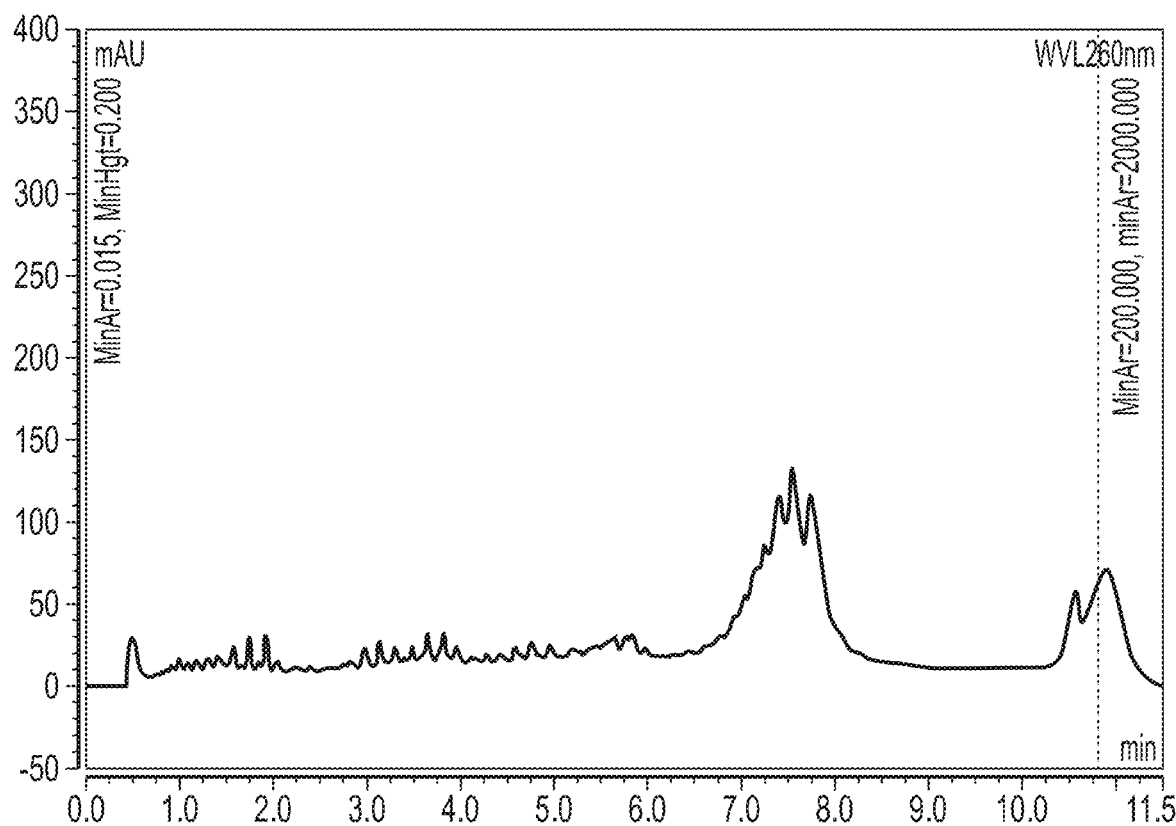

Additionally, universal linkers may be used for nucleic acid molecule synthesis according to embodiments disclosed herein and discussed below. A universal linker is a linker that allows for the synthesis of nucleic acid molecules regardless of the nature of the 3'-terminal base of the first nucleotide that is to be sequenced. In such a case, Y will be a molecule containing a hydroxyl group that can be reacted with a phosphoramidite nucleotide, such as the ((3aR,4S, 5R,7R,7aS)-5,6-dihydroxy-2-phenylhexahydro-1H-4,7-epoxyisoindole-1, 3(2H)-dione of UnyLinker™. Different linkers with different properties are known to those skilled in the art and can be selected by the skilled person depending on the downstream process requirements. In certain embodiments, the polymer particle carries a universal linker such as e.g. a UnyLinker™ as described in Ravikumar et al., "UnyLinker: An Efficient and Scaleable Synthesis of Oligonucleotides Utilizing a Universal Linker Molecule: A Novel Approach To Enhance the Purity of Drugs"; Org. Process Res. Dev., 2008, 12 (3), p. 399-410. In embodiments the particle comprises a universal linker such as a linker illustrated on a universal solid support in Guzaev, "Solid-Phase Supports for Oligonucleotide Synthesis", Current Protocols in Nucleic Acid Chemistry 3.1.1-3.1.60, June 2013, e.g. at in FIG. 3.1.4 of Guzaev.

Capping

Polymer particles loaded with linkers may still comprise reactive amine groups on their surface that may interfere with oligonucleotide synthesis. To remove such reactive groups, linker-carrying particles may be subjected to a capping process prior to oligonucleotide synthesis. For example, reagents such as acid anhydride or isocyanate may be used to inactivate reactive amines on the particle surface. Capping may be performed at room temperature for about 48 hours or alternatively at a higher temperature and reduced incubation times (such as, e.g., at 50° C. for 24 hours).

Compared to particles comprising aromatic amines, the polymer particles of the disclosure provide a number of advantages regarding capping. For example, free aromatic amines cannot undergo certain reactions required to allow detection by standard methods such as e.g. the Kaiser test (Kaiser, E. T. et al., "Color Test for Detection of Free Terminal Amino Groups in the Solid-Phase Synthesis of Peptides"; in Analytical Biochemistry, 1970, 34 (2), p. 595 ff.). This means that, unlike the present particles, for aromatic amines it is not possible to easily confirm whether or not capping has successfully inactivated all of the remaining active amines. Any remaining active amines could result in adverse side reactions during subsequent use of the capped particles, e.g. for oligonucleotide synthesis.

Preparation of Particles

Porous cross-linked polymer particles disclosed herein may be formed by a two stage process, named the Ugelstad process after the late Professor John Ugelstad, which is described for example in EP-B-3905 and U.S. Pat. No. 4,530,956. An improved Ugelstad process is described in WO 00/61647. In the Ugelstad process, seed particles, suitably made by emulsion polymerization, are converted in two steps into monodisperse particles by seeded suspension polymerization. In a first step, the seed particles are swollen by making a fine (e.g. submicron) aqueous emulsion of a relatively low molecular weight water-insoluble substance and then adding a water-miscible organic solvent (e.g. acetone) so that the water-insoluble substance diffuses into the seed particles. It is convenient for the water-insoluble substance to be a heat-activated polymerisation initiator. In a second step, the solvent is then removed, locking the water-insoluble substance in the seed particles, and the seed particles take up a large quantity of monomer and also a crosslinker. Following initiation of polymerization, e. g. by heating to activate the initiator, larger polymer particles are produced. The Ugelstad process therefore comprises making seed particles by emulsion polymerization and expanding the seed particles by suspension polymerization. Where the second step comprises monomer but no crosslinker, the larger polymer particles formed are not cross-linked and may be used as (larger) seed particles in a further Ugelstad process.

In a simplified version of the Ugelstad process, the enhanced capacity for swelling may be achieved simply by the use of oligomeric seed particles, e.g. where the oligomer weight average molecular weight corresponds to up to 50 monomer units (a molecular weight of about 5000 in the case of polystyrene). This is described in U.S. Pat. No. 4,530,956. In another version of the Ugelstad process, described in WO2010/125170, oligomeric seed particles can be used to make monodisperse particles with an average diameter in the submicron range.

Seed particles described in the above paragraphs represent exemplary seed particles that may be used to make polymer particles of the present disclosure. For example, such seed particles are exemplary seed particles that may be used in the methods of forming cross-linked polymer particles of the invention.

An embodiment provides a method of forming porous cross-linked polymer particles, comprising:

forming an aqueous dispersion (a) of seed particles comprising an activating agent and allowing the activating agent to diffuse into the seed particles;

contacting the solution (a) with a solution (b) comprising at least one monovinyl monomer, at least one polyvinyl monomer, a monomer of formula (I), at least one porogen, and if required at least one initiator;

allowing the monomers to diffuse into the seed particles to form swollen seed particles; and activating the initiator and allowing polymerization to proceed. The monomer of formula (I) is defined as follows:

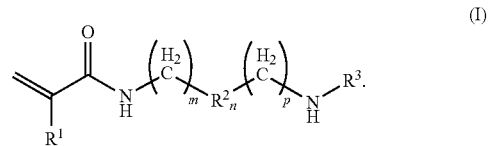

$R^1$, $R^2$, m, n and p are as defined herein in relation to the polymer particles of the disclosure. $R^3$ is a protecting group.

The protecting group may be selected from tert-butyloxycarbonyl (Boc), carbobenzyloxy (Cbz), p-methoxybenzyl carbonyl (MeOZ), 9-fluorenylmethyloxycarbonyl (FMOC), acetyl (Ac), benzoyl (Bz), benzyl (Bn), carbamate, p-methoxybenzyl (PMB), 3,4-dimethoxybenzyl (DMPM), p-methoxyphenyl (PMP), and trichloroethyl chloroformate (Troc), The protecting group may be Boc.

The at least one monovinyl monomer may be a monovinyl monomer as defined herein in relation to "Polymer Particles". The at least one polyvinyl monomer may be a polyvinyl monomer as defined herein in relation to "Polymer Particles".

The monomer of formula (I) may be a monomer of formula (II) as defined herein. The monomer of formula (I) may be Boc-TOTA.

The polymer particles formed may be monodisperse. The polymer particles formed may be monodisperse particles having a low coefficient of variation (CV), e.g. a CV which may be within a range of 1 to 10%, 1 to 20%, 1 to 30%, 1 to 30%, 3 to 20%, 5 to 15%, 2 to 10%, 10 to 25%, less than 10%, preferably less than 5% or less than 3%. The polymer particles may have a CV of less than 10%. The polymer particles may have a CV of less than 5%.

The polymer particles formed may have an average diameter according to the sizes disclosed herein. The polymer particles formed may have an average diameter of from 0.5 μm to 100 μm. The polymer particles formed may have an average diameter of from 1 μm to 100 μm. The polymer particles formed may have an average diameter of from 10 μm to 50 μm.

The monomers may be present in the following relative amounts: at least one monovinyl monomer in an amount of from 20-89 wt %; at least one polyvinyl monomer in an amount of from 10-60 wt %; and at least one monomer of formula (I) in an amount of from 1-20 wt %. The monomers may be present in the following relative amounts: at least one monovinyl monomer in an amount of from 35-84 wt %; at least one polyvinyl monomer in an amount of from 15-50 wt %; and at least one monomer of formula (I) in an amount of from 1-15 wt %. The monomers may be present in the following relative amounts: at least one monovinyl monomer in an amount of from 50-78 wt %; at least one polyvinyl monomer in an amount of from 20-40 wt %; and at least one monomer of formula (I) in an amount of from 2-10 wt %.

The polymer particles formed may comprise a diameter of from 1 µm to 100 µm, optionally from 10 µm to 50 µm, with a coefficient of variation of less than 10%, optionally less than 5%; and/or a surface area of from 200 $m^2/g$ to 600 $m^2/g$ (e.g. from 300 $m^2/g$ to 500 $m^2/g$); and/or a porosity of from 60 to 80%, and/or a loading capacity of at least 80 µmol/g, optionally at least 100 µmol/g, further optionally at least 200 µmol/g (e.g. at least 400 µmol/g).

The polymer particles formed may comprise an amine monomer content of from 2 mol % to 8 mol %. For example, the polymer particles formed may comprise an amine monomer content of from 3 mol % to 7 mol % (e.g. an amine monomer content of from 4 mol % to 6 mol %).

The seed particles may be polystyrene seed particles. The seed particles may be monodisperse. The seed particles may be oligomeric seed particles. The seed particles have an average diameter of from 0.3 µm to 10 µm. The seed particles may have an average diameter of from 1 µm to 8 µm. The seed particles may have an average diameter of 3 µm to 6 µm. The seed particles are present in the aqueous dispersion (a) in an amount of from 5 to 50 g/L.

The activating agent may be an initiator. The activating agent may be selected from bis(2-ethylhexyl)adipate and dioctanolperoxide. The activating agent may be present in the aqueous dispersion (a) in an amount of from 50 to 150 g/L. The activating agent may be present in the aqueous dispersion (a) in an amount of from 80 to 120 g/L.

The aqueous dispersion (a) may further comprise an anionic surfactant. The anionic surfactant may be selected from sodium dodecyl sulfate, ammonium dodecyl sulfate, sodium trideceth sulfate, sodium decyl sulfate and Triton XQS-20. The anionic surfactant may be sodium dodecyl sulfate or sodium docyl sulfate. The anionic surfactant may be sodium dodecyl sulfate. The anionic surfactant in the aqueous dispersion (a) may be in an amount of from 0.5 to 10 g/L.

The allowing the activating agent to diffuse into the seed particles may comprise mixing the aqueous dispersion for at least 6 hours (e.g. at least 9 hours or at least 12 hours), optionally at a temperature of at least 20° C. The allowing the activating agent to diffuse into the seed particles may comprise mixing the aqueous dispersion for not more than 72 hours, for example not more than 48 hours (e.g. not more than 24 hours).

The monomers may be present in solution (b) in the following amounts: at least one monovinyl monomer in an amount of from 20 to 80 g/L (e.g. from 30 to 70 g/L); at least one polyvinyl monomer in an amount of from 10 to 70 g/L (e.g. from 20 to 60 g/L); and at least one monomer of formula (I) in an amount of from 2 to 10 g/L (e.g. 4 to 8 g/L).

The porogen may be present in an amount of from 50 to 300 g/L. The porogen is any solvent or combination of solvents that are sufficiently miscible with the monomers but that will not take part in the vinylic polymerization reaction. Good porogens may be identified empirically by the skilled person. Suitable porogens include aromatic organic solvents (e.g. benzene, toluene, dimethylbenzene) and aliphatic organic solvents (e.g. hexane, heptane, octane). The porogen may comprise an aromatic organic solvent and/or an aliphatic organic solvent. The porogen may comprise an aromatic organic solvent and an aliphatic aromatic solvent. The ratio of aromatic organic solvent (g/L):aliphatic aromatic solvent (g/L) may be from 1 to 10 (e.g. may be from 1.5 to 5). The porogen may comprise toluene and/or heptane. The porogen may comprise toluene and heptane. The ratio of toluene (g/L):heptane (g/L) may be from 1 to 10 (e.g. may be from 1.5 to 5).

At least one initiator may be present in solution (b). The at least one initiator may be 2,2'-azobis(2-methylbutyronitrile), 2,2'-Azobis(2-methylpropionitrile) or dioctanolperoxide. The at least one initiator may be 2,2'-azobis(2-methylbutyronitrile). The at least one initiator may be present in solution (b) in an amount of 1 to 10 g/L. The at least one initiator may be present in solution (b) in an amount of 2 to 8 g/L.

Solution (b) may further comprise at least one steric stabilizer. The at least one stearic stabilizer may be a cellulose ether. The cellulose ether may have a weight average molecular weight of from 10 to 100 kDa (e.g. from 15 to 80 kDa or from 20 to 70 kDa). The at least one stearic stabilizer may be selected from alkyl celluloses (e.g. $C_{1-4}$-alkyl celluloses) and (hydroxyalkyl) alkyl celluloses (e.g. (hydroxy-$C_{1-4}$-alkyl)$C_{1-4}$-alkyl celluloses. The at least one stearic stabilizer may be selected from (hydroxy-$C_{1-4}$-alkyl) methyl celluloses). The at least one stearic stabilizer may be selected from Methocel K100, Benecel MP 333C, Benecel MP 651C, Culminal MHPC 1500, Culminal MHPC 400 and Walocel MK 400 PFV, optionally wherein the at least one stearic stabilizer is Methocel K100. The at least one stearic stabilizer may be present in solution (b) in an amount of from 0.2 to 5 g/L (e.g. from 0.5 to 4 g/L).

The solution (b) may further comprise an anionic surfactant present in an amount of from 0.1-1 g/L (e.g. 0.2 to 0.8 g/L). The anionic surfactant may be selected from sodium dodecyl sulfate, ammonium dodecyl sulfate, sodium trideceth sulfate, sodium decyl sulfate and Triton XQS-20. The anionic surfactant may be sodium dodecyl sulfate or sodium docyl sulfate. The anionic surfactant may be sodium dodecyl sulfate.

During the (ii) contacting, solution (a) may comprise 0.5 wt % to 10 wt %, with the balance (wt %) comprising solution (b).

Step (iii) allowing the monomers to diffuse into the seed particles to form swollen seed particles, may comprise mixing the contacted dispersion for at least 15 minutes (e.g. at least 30 minutes or at least 45 minutes) at a temperature of from 10° C. to 40° C. Step (iii) may comprise mixing the contacted dispersion for not more than 72 hours, for example not more than 48 hours (e.g. not more than 24 hours).

The activating and allowing polymerization to proceed may comprise heating to a temperature of at least 50° C. for a period of at least 2 hours (e.g. at least 3 hours or at least 4 hours).

The method may further comprise (v) removing the protecting group $R^3$, thereby forming polymer particles comprising exposed amine groups. The removing may comprise contacting the protected polymer particles with a strong acid. The strong acid may be a concentrated strong acid. The strong acid may be selected from hydrochloric acid, sulfonic acid, trifluoroacetic acid, p-toluenesulfonic acid or methanesulfonic acid. The strong acid (e.g. concentrated strong acid) may be an aromatic sulfonic acid. The strong acid (e.g. concentrated strong acid) may be p-toluenesulfonic acid.

The method may further comprise (vi) conjugating a linker to the exposed amine groups of the particles. The conjugating may comprise activation of the carboxylic acid groups on the linker. Activation of the carboxylic acid group may comprise forming an activated ester using a coupling reagent such as a carbodiimide or phosphonium/uronium/aminium salt or other reagents typically used for this purpose. The activated ester may be reacted with nucleophilic amine groups like those on the solid support with loss of a leaving group, such as a urea or a benzotriazol.

The linker may be a linker as described herein. The linker may be a universal linker for nucleic acid molecules and/or the linker may be a cleavable linker. The linker may be a succinyl linker. The linker may be a UnyLinker™.

The method may further comprise (vi) coupling a starter nucleoside (e.g. a starter phosphoramidite) to the exposed amine groups of the particles.

The method may further comprise, after conjugating the linker or starter phosphoramidite, capping any exposed amine groups of the particle. Capping may comprise contacting the particles with an acid anhydride (e.g. acetic anhydride) or isocyanate to inactivate the exposed amine groups of the particles.

The method may further comprise (vii) coupling a starter phosphoramidite to the linker.

The method may further comprise (viii) synthesizing an oligonucleotide on said particles. The synthesizing may comprise a conventional method of oligonucleotide synthesis as disclosed herein.

Analytical Methods

Molecular Weight Measurement

The weight average molecular weight (Mw) of the oligomers in the seed particle can be determined from measurements made using gel permeation chromatography (GPC). In GPC a series of polymer particle standards are run and used to generate a calibration curve. The Mw of the oligomers may be measured by GPC relative to polystyrene standards using as eluent DMF with 0.01 M LiBr. As these Mw values are calculated relative to standards of a polymer (polystyrene) that is different to that of the seed particles, the calculated Mw represents a relative value, rather than an absolute value. The measurements will therefore be reproducible, but will not provide the actual Mw.

An outline of a suitable GPC method is as follows. Experimental conditions:
Eluent: THF
Precolumn: PSS GRAM, 10 μm, Guard ID 8.0 mm×50 mm
Columns: PSS GRAM, 10 μm, Linear M ID 8.0 mm×300 mm PSS GRAM, 10 μm, Linear M ID 8.0 mm×300 mm
Temperature: 70° C.
Pump: PSS SECcurity 1260 HPLC pump
Flow rate: 1.0 mL/min
Inject. system: PSS SECcurity 1260 autosampler
Inject. volume: 50 μL
Sample conc.: 3.0 g/L
Detector: PSS SECcurity 1260 refractive index detector (RID)
Chromatography data system: PSS WinGPC UniChrom Version 8.2

Polystyrene standards with different molecular weights may be measured under the above experimental conditions to obtain a calibration curve. The samples to be measured should then be run. Mw is then calculated for the samples based on the PS calibration curve.

Size and Size Distribution

The size distribution of samples of particles, for example seed particles, can be measured using disc centrifugation, e.g. CPS Disc Centrifugation™ on Disc Centrifuge Model DC20000, using protocols provided by the instrument manufacturer. Accurate results require calibration with a standard of similar density to the sample being analysed and thus is only of use where a suitable polymeric standard is available, for example a set of compact polystyrene particle standards for particles of the present disclosure which typically comprise predominantly polystyrene. Where the samples being measured have a density that is not known, e.g. for porous particles, the measurement obtained by CPS disc centrifugation will be reproducible but will not provide the actual diameter.

An outline of the CPS Disc Centrifugation™ that was used in the examples provided herein is as follows. Disc centrifuge analysis was performed on a CPS DC20000 from CPS instruments with a disc speed of 7500 rpm and a gradient of 3-7 wt % sucrose in 1.5 g/L SDS (aq.). The gradient was made using an Auto Gradient pump from CPS instruments and the volume of the injected gradient was 16-17 mL. The method used for analysis had the following settings: Max. diameter 6.0 μm, min. diameter 0.05 μm, particles density 1.032 g/mL, particle refractive index 1.032, particle absorption 0, particle non-sphericity 1, calibration standard diameter 0.486 μm, calibration standard density 1.052, standard half-with 0.15 μm, liquid density 1.016 g/mL, liquid refractive index 1.343. The size reported is the absorption peak diameter and the CV is determined by setting the borders around the main peak.

The diameter of polymer particles may be measured by the Coulter counter principle, in accordance with the method described in Example 1. Coulter counter based methods are particularly suitable for particles of 1 μm or larger, e.g. for porous cross-linked polymer particles.

Another technique that can be used to determine the size and size distribution of particles is optical microscopy. A population of beads or particles may be prepared by placing an aqueous solution comprising particles on a microscope slide, then capturing an image of the particles at a suitable level of magnification, e.g. 100× or greater, and analyzing the size of the particles using image analysis software. Where it is desired to investigate bead swelling in specific solvents, e.g. acetonitrile or dichloromethane, a method as disclosed in Example 7 may be followed.

Optical microscopy is a preferred method for measuring the size of the particles, as it provides a measurement that is independent of the density of the particles. Disc centrifuge analysis is a preferred method of measuring the size distribution of particles (CV), as optical microscopy is based on image analysis and the presence of artefacts in the image can result in an artificially high CV.

Uses and Applications of Polymer Particles

Oligonucleotide Synthesis

Polymer particles of the invention may be used in the synthesis of oligonucleotides, for example using conventional methods of oligonucleotide synthesis.

Conventional oligonucleotide synthesis methods follow a series of basic steps together often referred to as "synthesis cycle" which may include at least the following exemplary steps b) to f), with appropriate washing steps using one or more solvents such as acetonitrile, ethyl acetate or other washing reagents suitable for practicing solid phase synthesis:

In exemplary step a) a first phosphoramidite, which has been protected at the 5' position (or, in certain embodiments wherein synthesis proceeds in the 5' to 3' direction, the first phosphoramidite may be protected at the 3' position), is derivatized to a solid support such as a polymer particle according to the invention (e.g. by coupling to a universal linker), or is obtained prederivatized as described elsewhere herein;

In exemplary step b), the 5'-dimethoxytrityl (DMT) protecting group of the first phosphoramidite (which may be modified or unmodified) is removed, e.g. via detritylation. This process which is often referred to as "deblocking" typically uses an acid such as for example trichloroacetic acid (TCA) or dichloroacetic acid (DCA) in dichloromethane (DCM) or DCA in toluene. Alternatively, electrochemically generated acid ("EGA") or photogenerated acid (PGA) may be used for deprotection. Exemplary EGA or PGA compositions are described e.g. in WO 2013/049227, application No. PCT/US2015/064700 or in Maurer et al., "Electrochemically Generated Acid and Its Containment to 100 Micron Reaction Areas for the Production of DNA Microarrays", PLoS, 2006, Issue 1, e34.

In exemplary step c) a second phosphoramidite which has the phosphorus, sugar and base groups protected, is added to the deblocked 5'-OH group of the first phosphoramidite. Before the second phosphoramidite is coupled it is typically activated which can be achieved using either an imidazole-type or tetrazole-type catalyst (such as e.g. tetrazole or 4,5-dicyanoimidazole). The activated second phosphoramidite is then reacted with the 5'-OH group of the first phosphoramidite to obtain a trivalent phosphite triester. This process is often referred to as "coupling" and has a general efficiency of above 99% (typically about 99.8%), leaving a very small number of 5'-OH groups unreacted.

In exemplary step d) the unreacted 5'-OH groups of the first phosphoramidites are capped and thereby excluded from subsequent coupling reactions to avoid accumulation of deletions. This process often referred to as "capping" is typically performed by acetylation using, for example, acetic anhydride and N-methylimidazole, preferably in the presence of a base (such as lutidine or pyridine);

In exemplary step e) the phosphite triester resulting from step c) is oxidized to form the more stable phosphate triester, which process is often referred to as "oxidation". Oxidation is typically achieved using iodine reagents (such as for example iodine in THF/pyridine/water). In cases where phosphorothioate oligos are synthesized, the oxidation step e) may be replaced by a sulphurisation step.

In exemplary step f) the synthesis cycle including steps b) to e) is repeated as needed depending on the desired length of the oligonucleotide. The skilled in the art will recognize that in certain embodiments of the invention the order of steps may vary or some of the steps including the washing steps may be repeated as appropriate according to the used protocol. For example, after final step e) another step b) may be performed to remove the 5'-DMT group from the last coupled phosphoramidite. During synthesis, steps b) to e) may be carried out under positive gas pressure e.g. using argon or nitrogen or any other inert gas to prevent exposure of the reactive intermediates to air.

After synthesis, the oligonucleotides may be subject to exemplary step g) which includes cleavage of the oligonucleotides from the solid support and removal of the protecting groups, a process often referred to as "cleavage and deprotection". This is typically achieved using aqueous or gaseous ammonia at elevated temperatures. Both reactions may be performed subsequently or in a single step depending on the used conditions. For example, where gaseous anhydrous ammonia is used, both steps occur simultaneously and the fully deprotected oligonucleotide is eluted from the support either with water or buffer, depending on subsequent steps for quantification or purification. Deprotection conditions may also vary depending on the type of modification of the phosphoramidites used for synthesis or the type of nucleobase protection used to synthesise the oligonucleotide backbone. For example, standard DNA bases protected with conventional groups (e.g. Bz-dA, Bz-dC, iBu-dG) may be deprotected using ammonium hydroxide.

In some embodiments, it may be desired to leave the terminal 5'-DMT group on the synthesized oligonucleotides for subsequent purification by not performing a final deblocking step b). The trityl group can then be used to purify full-length oligonucleotides via hydrophobic interaction with C18 silica or polystyrene support. Alternatively or in addition, oligonucleotides may be purified by conventional methods such as desalting, reverse phase HPLC, polyacrylamide gel electrophoresis ("PAGE") or anion exchange HPLC.

In some aspects, the particles of the invention may be used in automated synthesizers for non-template directed synthesis of oligonucleotides. Exemplary synthesis platforms and systems that may be used in combination with particles of the invention are described e.g. in U.S. Pat. Nos. 5,368,823, 5,472,672 or in EP0683790.

In certain embodiments, oligonucleotide synthesis may be performed in a microfluidic platform or a microwell plate. In instances where synthesis is conducted in wells of a microwell plate, the particles used for solid phase synthesis may be monodisperse and the particle size may be chosen depending on the size of a well of the microwell plate, for example to allow only one single particle to occupy a well as described elsewhere herein. In certain instances, the microwell plate may be or comprise a microchip. Each well of the microwell plate or chip may be configured to accommodate a monodisperse particle having a diameter of about 10-50 μm (e.g. about 35 μm). Thus, particles of the invention may be used for solid phase nucleic acid synthesis in a microfluidic platform, wherein the high loading capacity allows for the synthesis of picomole amounts of oligonucleotides on a single particle/in a single well as described elsewhere herein. Solid support synthesis using particles of the invention may, for example, be performed using methods and systems as described in WO 2013/049227, application No. PCT/US2015/064700 or in Maurer et al., PLoS, 2006, Issue 1, e34.

The plate or chip may comprise a single particle located in each of a plurality of wells of the plate/chip and an electrochemically generated acid (EGA) being present in one or more of the plurality of wells. Instead of or in addition to having EGA in one or more wells, wells of the plate may contain other reagents set out elsewhere associated with the synthesis of nucleic acid molecules. A photogenerated acid (PGA) may be present in one or more of the plurality of wells instead of or in addition to an EGA. The EGA or PGA is used to remove the protecting group (e.g., DMT) before the next amidite is added to the nucleic acid molecule attached to the solid support. Thus, particles of the invention may be used in solid phase synthesis of nucleic acid molecules, wherein the solid phase synthesis comprises an electrochemical or photochemical deblocking step.

At least one proton carrier, such as 2-chloro-6-methylpyridine or diphenylamine, may be present in the solution with the EGA or PGA. The at least one proton carrier may act to reduce the effect of DNA degradation by accepting protons from the EGA or PGA, thereby adjusting the acidity of the solution.

Particles of the invention may be prepared at reproducible quality (FIG. 7) and have been shown to provide oligonucleotides at high yield and purity (Examples 5 and 6, respectively). Particles of the invention may therefore be useful in oligonucleotide production procedures demanding high process stability and reliability and high quality standards such as e.g. GMP manufacturing conditions, where oligonucleotide quality is critical for downstream applications including diagnostic and therapeutic uses.

Furthermore, particles of the invention are characterized by a high loading capacity which allows for high yield production of oligonucleotides of a certain length. As shown in Example 5, a higher yield of oligonucleotides having a length of more than 50 nucleotides can be achieved when using particles according to the invention as compared to aminostyrene particles. Aspects of the invention therefore include particles which are loaded with oligonucleotides having a length of at least 50 nucleotides (preferably at least 60 nucleotides) at amounts of at least 100 fmol, preferably at least 1 pmol.

High loading capacity renders particles of the invention particularly useful for large scale manufacture. For example, therapeutic grade oligonucleotides produced for preclinical and clinical studies may be required at amounts ranging from a few grams to several kilograms. Aspects of the invention therefore include uses of the disclosed particles for the production of therapeutic grade oligonucleotides.

The invention includes methods for the synthesis of high yields of oligonucleotides with a low error rate. The invention further comprises compositions and methods wherein the amount of oligonucleotide of a certain length (e.g. more than 35, more than 40, more than 45, more than 50, more than 55, more than 60 bases in length) synthesized on a polymer particle is between 30% and 50%, between 40% and 60%, between 50% and 70% or more than 50% of the total amount of oligonucleotides synthesized on a particle.

The invention further includes compositions and methods for the synthesis of an oligonucleotide on an optionally monodisperse polymer particle having a diameter between about 25 and about 40 µm, wherein the amount of oligonucleotide of a certain length (e.g. an oligonucleotide having at least 50, preferably at least 60 nucleotides) synthesized on the particle is selected from the group consisting of: 1 fmol to 10 pmol, 10 fmol to 5 pmol, and 50 fmol to 2.5 pmol (e.g. 10 fmol to 10 pmol, 100 fmol to 5 pmol, and 500 fmol to 2.5 pmol).

The invention includes compositions and methods for the synthesis of an oligonucleotide on an optionally monodisperse polymer particle, wherein the loading capacity of the particle is within a range selected from the group consisting of: about 100 µmol/g to about 500 µmol/g, about 150 µmol/g to about 300 µmol/g, or within a range of about 200 µmol/g to 250 µmol/g.

The invention includes compositions and methods for the synthesis of an oligonucleotide on a polymer particle, wherein the loading capacity of the particle is adjusted to allow for the production of oligonucleotides between 4 and 70 nucleotides in length with an error rate of less than 0.5% and/or at a yield of between 30% and 85%, between 40% and 60%, between 50% and 70% or more than 60% of the total amount of oligonucleotides synthesized on the support. For example, a polymer particle having a loading capacity of at least 100 µmol/g may allow for the production of oligonucleotides of about 20 nucleotides in length at a yield of at least about 80%.

The invention further includes a monodisperse porous particle for solid-phase synthesis of oligonucleotides of a length of between 20 and 70 bases, wherein the particle is an acrylamide polymer particle coated with amine groups, and wherein said particle comprises: a diameter of between 10 and 100 µm or between 20 and 40 µm with a coefficient of variation of less than 10% or less than 5%, a surface area within a range of between 200 and 600 m²/g or within a range of between 300 and 500 m²/g, a porosity within a range of about 50% to about 70%, optionally, an amine monomer content of between about 2% and about 10 mol % or between about 3 mol % and about 5 mol %, or less than 3 mol %, optionally a loading capacity of between about 20 µmol/g to about 300 µmol/g, or between about 40 µmol/g to about 270 µmol/g, or between about 50 µmol/g to about 250 µmol/g, or between about 100 µmol/g to about 200 µmol/g, and optionally, wherein said particle carries a linker, and optionally wherein the linker is a universal linker.

EXAMPLES

Example 1: Cross-Linked Porous Polystyrene/Acrylamide Particles Containing Amine Functionality, 32 µm 930 g of water, 121 g of bis(2-ethylhexyl)adipate, 155 g of acetone and 5 g of sodium dodecyl sulphate (SDS) was emulsified for 5 minutes by using an Ystral GmbH Ultra Turax X-10/25 mixer and homogenized in a two stage Manton Gaulin APV-1000 homogenizer at 400 kg/cm³ in the first stage and 100 kg/cm³ in the second stage for 5-8 minutes.

After homogenization, 275 g of the emulsion was charged with a seed suspension of monodisperse oligomeric styrene particles (seed particles) having a particle diameter of 4.8 µm. Eighty grams of seed suspension containing 7 g of oligomeric particles and 73 g of water was used.

After stirring at 45° C. for 1 day, 9.3 g of the seed suspension containing activated seed particles were charged to 257.7 g of an emulsion containing 187.2 g of water, 0.3 g of Methocel K-100 (manufactured by Dow Chemicals and purchased from Univar AS), 0.1 g of SDS, 9.9 g of divinylbenzene (DVB) (i.e., 80% by weight DVB, 20% by weight ethyl vinyl benzene and other byproducts in DVB production), 12.4 g of styrene, 3.0 g of 50% Boc-TOTA in phenethyl acetate, 30.3 g of toluene, 13.0 g of heptane and 1.3 g of 2,2'-azobis (2-methylbutyronitrile). The mixture was emulsified for 5 minutes by using an Ystral GmbH Ultra Turax X-10/25 mixer and homogenized at 400 kg/cm² in the first stage and 100 kg/cm² in the second stage for 8-12 min.

After swelling at 27° C. for 1 hour, 83.3 g of water and 0.6 g of Methocel K-100 were charged to the reactor. The dispersion was then polymerized for 1 hour at 60° C. and 10 hours at 70° C., yielding a suspension of particles having a diameter of 32 µm and comprising 4 mol % Boc-TOTA.

The particles were separated from the liquid phase by flotation and the liquid phase was discharged. The particles were then cleaned with 0.5 litres of 2 g/L SDS solution (aq) by stirring for 30 min followed by flotation and removal of the liquid. This was repeated four times. Methanol (0.5 litres) was then added and the particle suspension was stirred for 30 min followed by sedimentation. Upon removal of the supernatant and addition of fresh methanol, the washing was repeated three times. Finally, the particles were drained and sieved through a 100 µm sieving cloth. Diameter was measured on particles dispersed in aqueous electrolyte solution containing 1% NaCl and 0.01% Synperonic A11 (Polyoxyethylene (11) C12-C15 alcohol; Croda International Plc) by Coulter Counter principle on a Multisizer 4 from Beckmann Coulter.

Example 2: Deprotection of Boc-TOTA Particles

A 50 mL Duran flask with 1.1 g of Boc-TOTA particles, prepared as described in Example 1, in tetrahydrofuran (THF) had as much solvent as possible removed by suction. Then, 33 g of p-toluenesulfonic acid monohydrate (173 mmol) was dissolved in 100 mL of THF and 22 mL of this solution was added to the particle slurry. The flask lid was wrapped in parafilm and the container put in a heated agitation bath and shaken at 190 Hz, 62° C. for 2 hours.

The particles were then allowed to sediment and the supernatant was removed. 50 mL of methanol was added and the flask shaken at room temperature for 30 minutes. Following removal of the methanol, the same washing procedure was repeated using 50 mL 0.01 M NaOH (aq) until the pH of the solution was >10. Finally, the particles were washed with 50 mL of methanol a minimum of three times. Removal of the protecting group could be confirmed by FTIR analysis.

Example 3: Conjugation of UnyLinker™ to Boc-TOTA Particles 0.9 g of the particles described in Example 2 in 12 g of toluene were charged to a 50 mL Duran flask. 273 mg of N,N'-diisopropylcarbodiimide (DIC) was added and the flask shaken at room temperature and 150 Hz. After 5 minutes, 841 mg UnyLinker™ succinate triethylammonium salt dissolved in 5 g of toluene was also introduced and the reaction shaken at 150 Hz, room temperature for 20 hours.

Upon completion, the particles were allowed to settle and the supernatant was removed. This was followed by addition of 50 mL of toluene and the suspension was shaken for 30 minutes. This washing was repeated twice and then three more times using 50 mL of THF instead of toluene.

The linker loading of the particles was confirmed to be within a range of 15-110 μmol/g by cleavage of the DMT protecting group from the UnyLinker™ using trichloroacetic acid (TCA) and subsequent analysis by ultraviolet-visible spectroscopy according to the following protocol: 10-20 mg of dry particles was weighed in a glass vial. 2 mL of 3 w % TCA in DCM was added and the vial shaken gently for 5 min. 200 μL of the solution was transferred to a 2 mL vial containing 1.8 mL of 0.1 M p-toluenesulfonic acid in acetonitrile. The 2 mL vial was shaken for 10 seconds and centrifuged to sediment the polymer. 100 μL were transferred to a new 2 mL vial containing 900 μL 0.1 M p-toluenesulfonic acid in acetonitrile. UV absorbance was measured in a cuvette at a wavelength of 498 nm.

$$L = 2*10^8 * \frac{A}{l*\varepsilon*m}$$

where L is the loading in μmol/g, A is the absorption at 498 nm, l is the cell length in cm, $\varepsilon$=68,700 L/(mol*cm) and m is the sample mass in mg.

Example 4: Capping of UnyLinker™-Functionalized Boc-TOTA Particles 0.9 g of Boc-TOTA particles in THF containing UnyLinker™ prepared as described in Example 3 were allowed to settle in a 50 mL Duran flask and as much of the solvent was removed by suction as possible. 18 g of CAP A and 18 g of CAP B (Sigma Aldrich) were added and the particles re-suspended. The lid of the flask was wrapped in parafilm and the flask put in a heated water bath with agitation at 190 Hz. The bath was heated to 62C° and left for 4 hours at that temperature.

The polymer was then allowed to settle and the supernatant was removed. This was followed by addition of 50 mL of THF and shaking at 150 Hz for 30 minutes. The washing was repeated three times and then four more times using 50 mL methanol instead of THF. Upon completion of the final wash, the particles were re-suspended in 25 mL of THF and concentrated in vacuo on a rotary evaporator.

Example 5: Comparison of Oligonucleotide Synthesis on Aminostyrene and Boc-TOTA Particles Oligonucleotide synthesis on various batches of particles comprising either Boc-TOTA or aminostyrene monomer at equal percentage, respectively, was compared in terms of quality and quantity using HPLC and detritylation data for analysis. Four particle batches were compared as specified in Table 6 below:

TABLE 6

Linker loading capacity for exemplary polymer particles

| Batch No. | Monomer | Linker loading capacity |
|---|---|---|
| 1 | 4% Boc-TOTA | 104 μmol/g |
| 2 | 4% Boc-TOTA | 95 μmol/g |
| 3 | 4% aminostyrene | 56 μmol/g |
| 4 | 4% aminostyrene | 67 μmol/g |

The linker loading capacity was measured as described in Example 3 and was determined to be on average at least about 30% higher for Boc-TOTA particles than for aminostyrene particles.

Oligonucleotide synthesis of a 54-mer having the sequence 5'-ACTATACTAGCTATGATAATGCCCAT-AGTCCGCTGAGATATAGTCCGCTGCTTA-3' was performed on ÄKTA™ Oligopilot™ Plus10 (GE Healthcare) loaded with the four different particle batches using standard reagents & protocols (1 μmol/synthesis) as described in Example 6.

After synthesis, the oligonucleotides where deprotected and cleaved using a mixture of concentrated ammonia and methylamine in water (2 h, 65° C.) before they were dried in a speedvac (Thermo Fisher Scientific) and subsequently dissolved in 200 μL water. 5 μL of a 1:100 dilution of the oligonucleotides where analyzed on a rpHPLC (hexylammonium acetate, water, acetonitrile; Dionex, Thermo Fisher Scientific) and full length 54-mer oligonucleotides identified via retention time.

As the temporary dimethoxytrityl (DMT) protection group in the 5'-hydroxyl of the particle-bound nucleoside is removed in every synthesis cycle, the absorption of the cleaved DMT cation at 500 nm can be measured during synthesis to determine efficiency of synthesis. A constant absorption of the DMT peaks at approx. 4000 mAU ("mili arbitrary units") in the shown intensity plots (FIGS. 3-6A) is an indicator for an efficient synthesis over the entire synthesis cycle, whereas a decreasing absorption of the DMT peaks over time indicates a reduced synthesis efficiency with increasing length of the oligonucleotide chain. The recurring peaks at 1500 mAU are caused by the absorption of the iodine containing oxidizer.

Figure 7A:
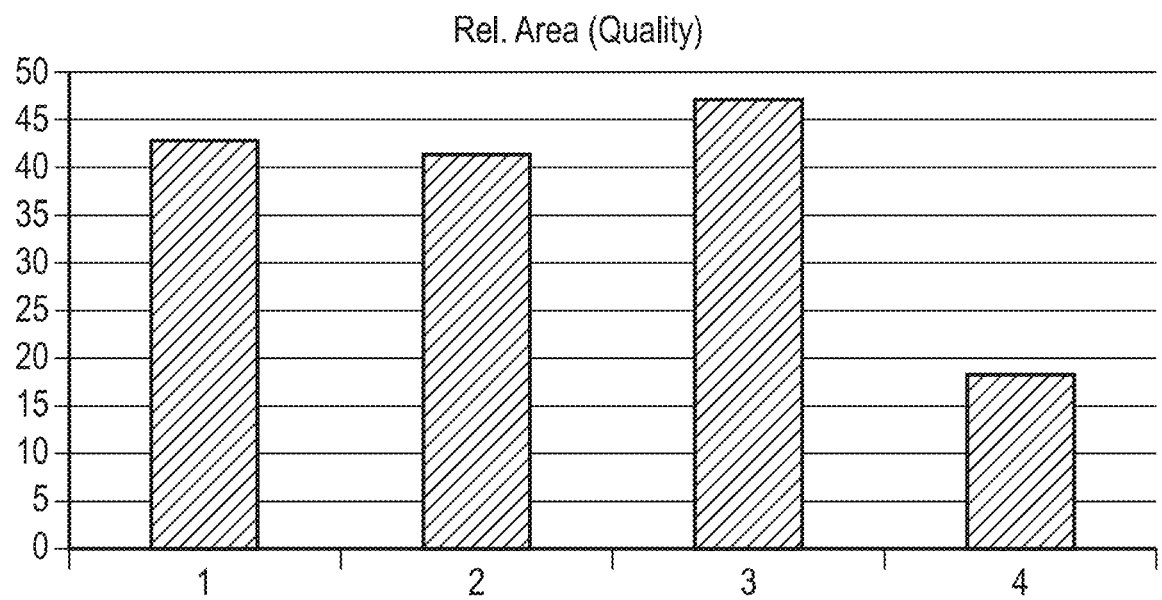
FIG. 7 shows a comparison of quality (A) and quantity (B) of oligonucleotides synthesized on particle batches prepared with Boc-TOTA or aminostyrene.
Figure 7B:
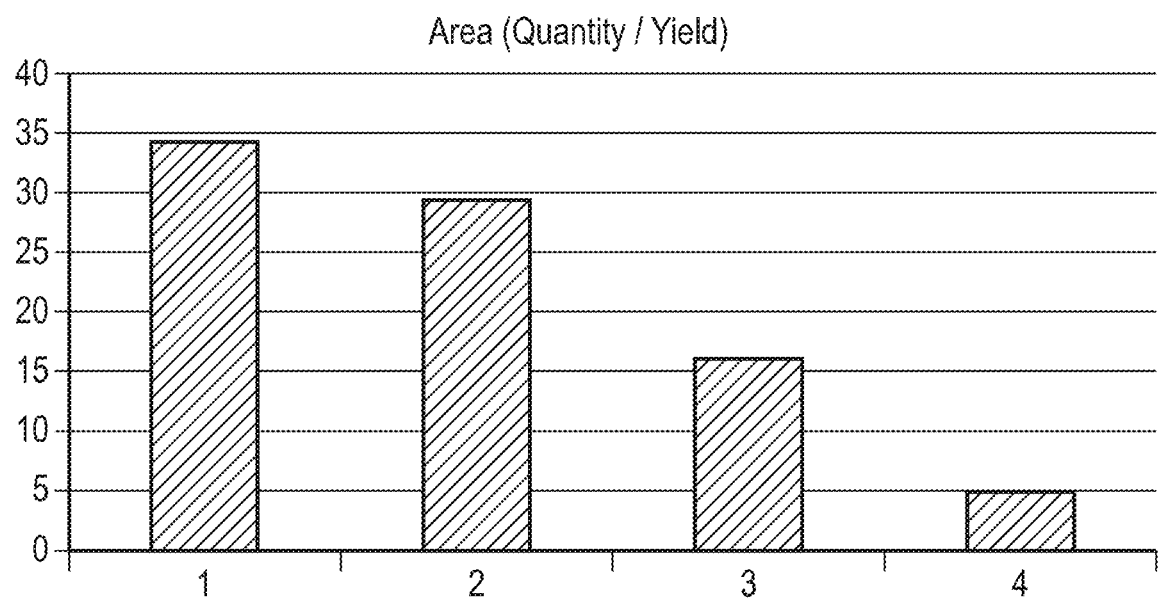
Figure 8A:
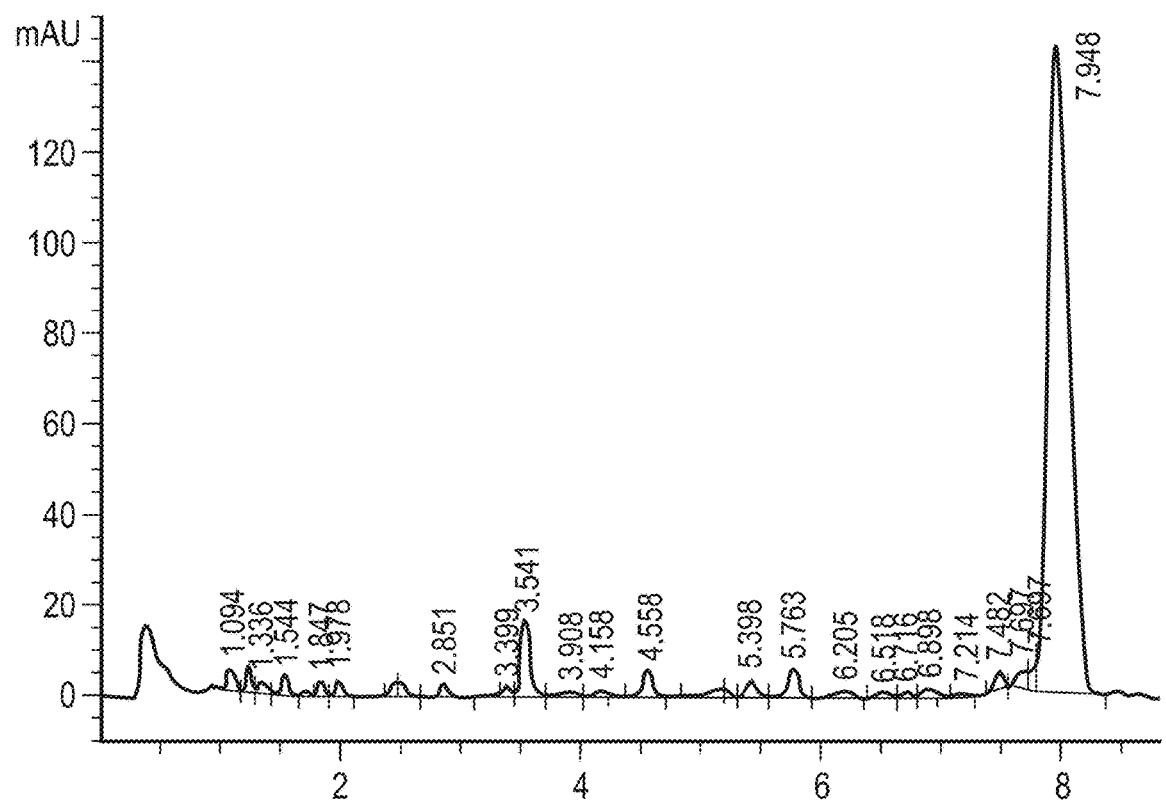
FIGS. 8A and B: Boc-TOTA particles (104 µmol/g)
Figure 8B:
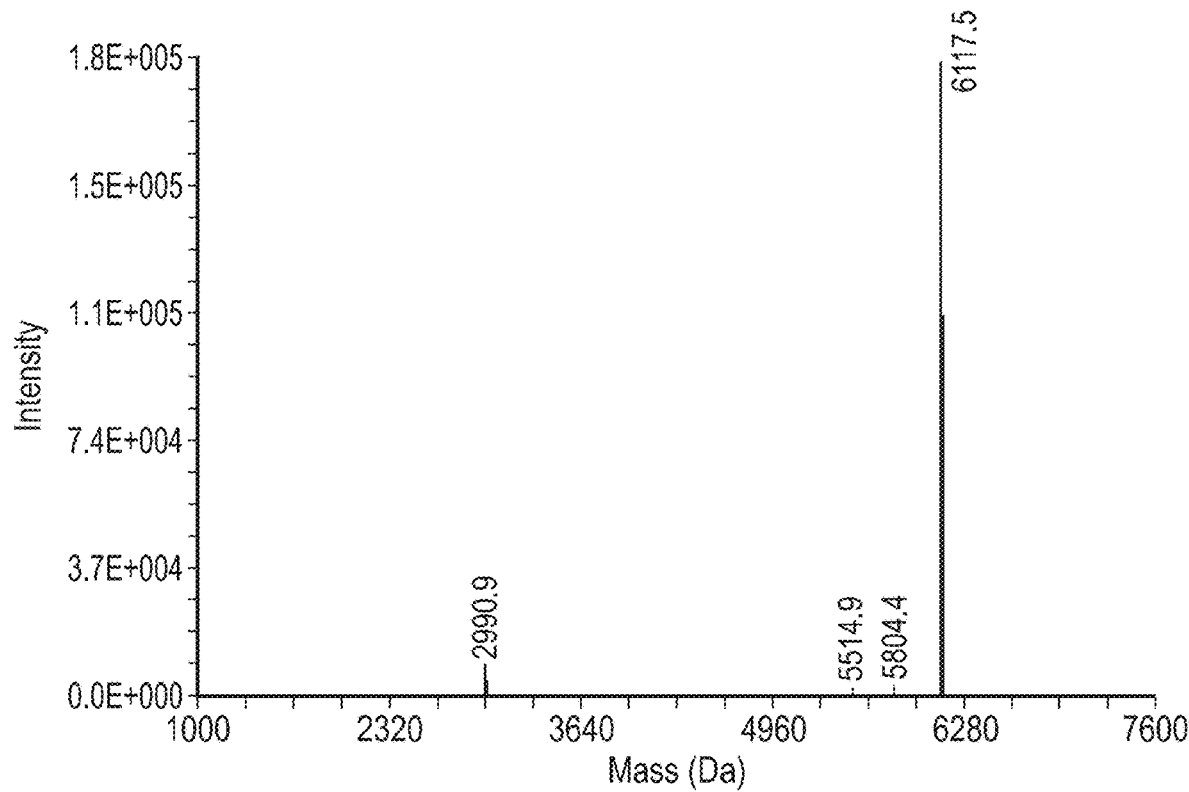
FIG. 8 shows rpHPLC ((A), (C) and (D)) and ESI-MS data (B) from oligonucleotide synthesis runs using pre-derivatized Boc-TOTA ((A) and (B)) and polystyrene ((C) and (D)) supports.
FIG. 8C: polystyrene particles (82 µmol/g)
FIG. 8D: polystyrene particles (205 µmol/g).
Figure 8C:
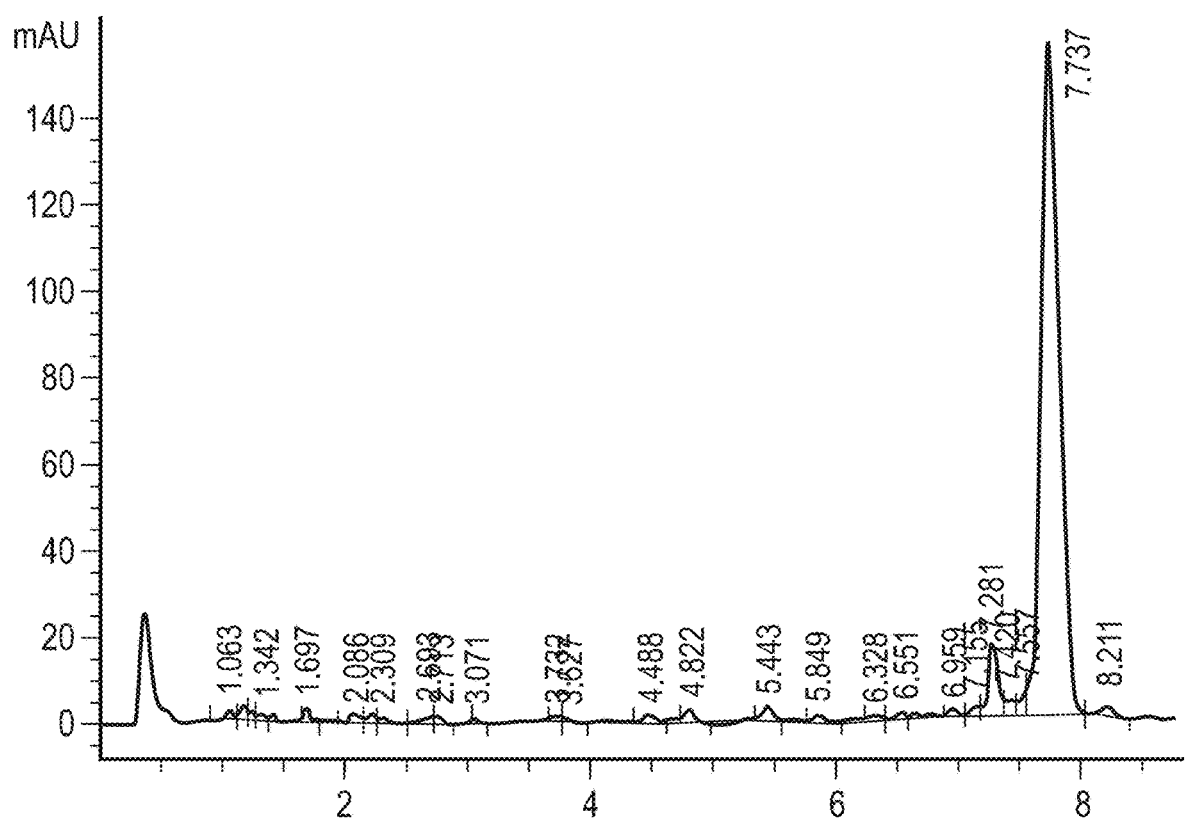
Figure 8D:
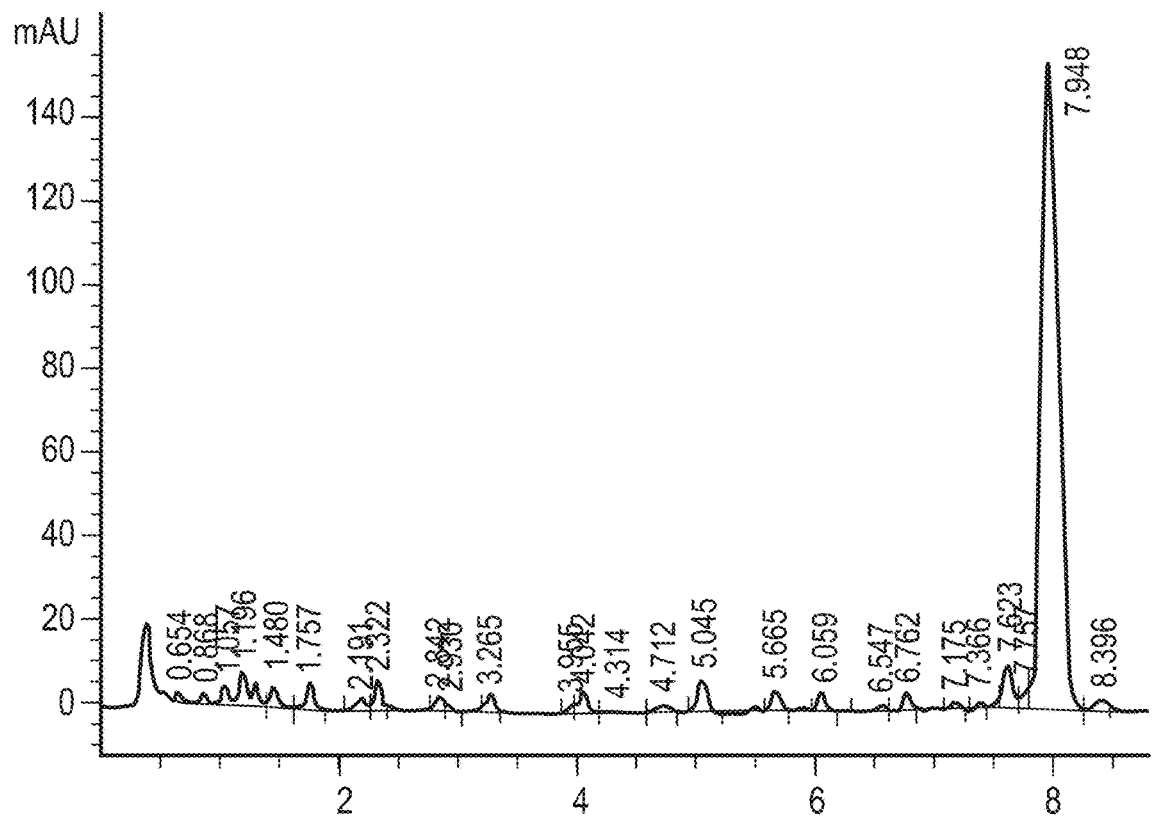

As shown in FIG. 7A, both Boc-TOTA particle batches (Nos. 1 and 2) and aminostyrene particle batch No. 3 showed a constant oligonucleotide quality as determined by the respective relative areas (percentage of peaks representing full length oligonucleotides), whereas aminostyrene particle batch No. 4 yielded a lower oligonucleotide quality. As further indicated in FIG. 7B, the oligonucleotide yield determined based on the peak areas shown in FIGS. 3-6B (expressed in mAU per minute) was significantly higher for both Boc-TOTA particle preparations (batches 1 and 2) as compared to the aminostyrene batches 3 and 4. These data demonstrate that oligonucleotides were efficiently synthesized on different Boc-TOTA particle batches at reproducible quality and that the use of Boc-TOTA particles as solid support resulted in higher oligonucleotide yields when compared to aminostyrene particles under equal synthesis conditions in accordance with the increased loading capacity.

Example 6: Oligonucleotide Synthesis on Boc-TOTA and Polystyrene Particles Derivatized with a Starter Base Boc-TOTA polymer particles ("Boc-TOTA") were prepared as described in Example 1 and deprotected as described in Example 2. The particles were then derivatized with succinyl-T nucleoside as follows:

1.7 g of particles were reacted with 595 μmol succinyl-T nucleoside (350 μmol nuc./g; (ChemGenes Corporation) using 595 μmol of 1-Cyano-2-ethoxy-2-oxoethylidenaminooxy) dimethylamino-morpholino-uronium hexafluorophosphate (COMU®; Novabiochem), 1,785 μmol of N,N-Diisopropylethylamine (DIPEA (Acros Organics) in 12 mL acetonitrile. The final nucleotide loading was measured as described in Example 3 and was determined as 105 μmol/g.

The dT-derivatized support was used for oligonucleotide synthesis and compared with two commercial polystyrene supports having succinyl-T nucleoside loadings of 82 μmol/g and 205 μmol/g, respectively, (hereinafter referred to as PS1 and PS2). A 20-mer oligonucleotide with the sequence 5'-GACTGACTGACTGACTGACT-3' was synthesized on all supports using an ÄKTA™ Oligopilot™ Plus 10 in a 1.2 mL column (GE Healthcare) according to the following protocol:

A 0.1 M solution of all phosphoramidites (5 g of dA$^{ibz}$, dC$^{bz}$, dG$^{ibu}$ and dT', respectively; TheraPure grade, Thermo-Fisher Scientific) in anhydrous acetonitrile was prepared. The amidites were dissolved by shaking or vortexing the bottles prior to adding a small trap pack or loading onto the synthesizer. Reagents used for synthesis (Merck Millipore) on ÄKTA™ Oligopilot™ Plus10 are listed in Table 7.

TABLE 7

ÄKTA ™ oligopilot ™ Plus10 synthesis reagents

| Synthesis Reagent | Concentration of Compound |
|---|---|
| Activator | 0.25M Ethyl-thio-1 H-tetrazole |
| Oxidation | 0.05M Iodine in 90/10 pyridine/water |
| Capping A | 20% N-methylimidizole in ACN |
| Capping B1 | 40% Acetic anhydride in ACN |
| Capping B2 | 60% 2,6-Lutidine in ACN |
| Deblock | 3% Dichloroacetic acid in Toluene |
| DEA Solution | 20% Diethylamine in ACN |
| Acetonitrile | Acetonitrile Anhydrous |

The reactor column was filled with 180 mg of the support (150 mg of support per 1 ml of Column Volume (CV)), and the packed column was arranged in the instrument according to the operating manual. Three synthesis runs were performed on the various supports using the parameters indicated in Table 8.

TABLE 8

Parameters used for synthesis run

| Column volume | 1.2 | ml |
|---|---|---|
| Scale | * | umol |
| Column diameter | 10 | mm |
| UV Detritylation | 460 | nm |
| Amedite purge volume | 0.2 | ml |
| Solvent purge volume | 2 | ml |
| CV column wash | 6 | CV |
| Detritylation flow | 400 | cm/h |
| Efficiency treshold | −1 | % |
| CV detritylation wash | 6 | CV |
| Eq Amedite DNA | * | Eq |
| Percent Activator DNA | 60 | % |
| Concentration Amidite DNA | 0.1 | M |
| Recycle Time DNA | 2.5 | min |
| CV Coupling Wash | 5 | CV |
| Volume Ox DNA | 1 | ml |
| CT Capping DNA | 0.5 | min |
| CV Capping DNA | 1 | CV |
| CV CT Capping DNA | 2 | CV |
| CV Capping Wash | 2.5 | CV |
| Purge volume of DEA | 2 | ml |
| DEA addition LFlow | 200 | cm/h |
| CT DEA treatment flow | 12.1 | min |

Synthesis scale and equivalents of amidite depend on support loading. Whereas higher loading (105 μmol/g) requires less equivalents of amidite to accommodate 1.2 ml size of the reactor, lower loading (82 μmol/g) requires more equivalents of amidite. Synthesis scales of the three runs are indicated in Table 9.

Following synthesis, oligonucleotides were cleaved using liquid ammonium hydroxide at 70° C. for 6 hrs or 55° C. for 16 hrs (to remove the iBu protective group) and were analysed by rpHPLC and ESI-MS (electrospray ionisation mass spectrometry) to determine crude oligonucleotide yield and purity (FIG. 8). All syntheses were successful, with coupling efficiencies ranging from 99.8% to 101.6% as specified in Table 9. Likewise, the detritylation as an indicator of synthesis efficiency yielded consistent DMT absorption peaks with equal peak heights and peak areas (data not shown).

Oligonucleotide yield and quality obtained with the three particle preparations were determined based on the rpHPLC data as described in Example 5. Oligonucleotide quality is expressed as percentage peak area representing the full length oligonucleotide peak at ~8 min. retention time (FIGS. 8A, C and D). rpHPLC data show comparable amounts of truncated products for both, Boc-TOTA and PS supports as reflected by the multiple small peaks. Truncation products of the synthesis run using Boc-TOTA particles were further analysed by ESI-MS (FIG. 8B) with only three side products identified, together representing about 6% of synthesized oligonucleotide.

As summarized in Table 9, oligonucleotide yield and purity obtained with the pre-derivatized Boc-TOTA support was comparable to yield and purity obtained with the standard commercial polystyrene supports.

TABLE 9

Oligonucleotide yield and purity, Boc-TOTA (BT) and polystyrene (PS)

| Suppport | Loading | Synthesis scale | Coupling efficiency | Yield | Purity |
|---|---|---|---|---|---|
| BT | 104 µmol/g | 18 µmole | 99.8% | 11 µmole (61%) | 80% |
| PS1 | 82 µmol/g | 19 µmole | 101.6% | 14 µmole (73%) | 82% |
| PS2 | 205 µmol/g | 49 µmole | 99.8% | 30 µmole (61%) | 76% |

In sum these data demonstrate successful loading of Boc-TOTA particles with a starter base and synthesis of high quality oligonucleotides using standard synthesis protocols.

Example 7: Swelling of Boc-TOTA Particles in Synthesis Solvents

Synthesis-scale calculations are a function of bulk support density and nucleoside loading. To determine at what density a synthesis column can be packed, the swelling effects of the support material in typical synthesis solvents needs to be considered. For this purpose, the volume increase of Boc-TOTA particles (batch No. 1 of Example 5; BT) in acetonitrile (ACN) and dichloromethane (DCM) was measured and compared to the swelling properties of commercial polystyrene (PS) support and aminostryene (batch No. 4 of Example 5; AS) particles.

Figure 9:
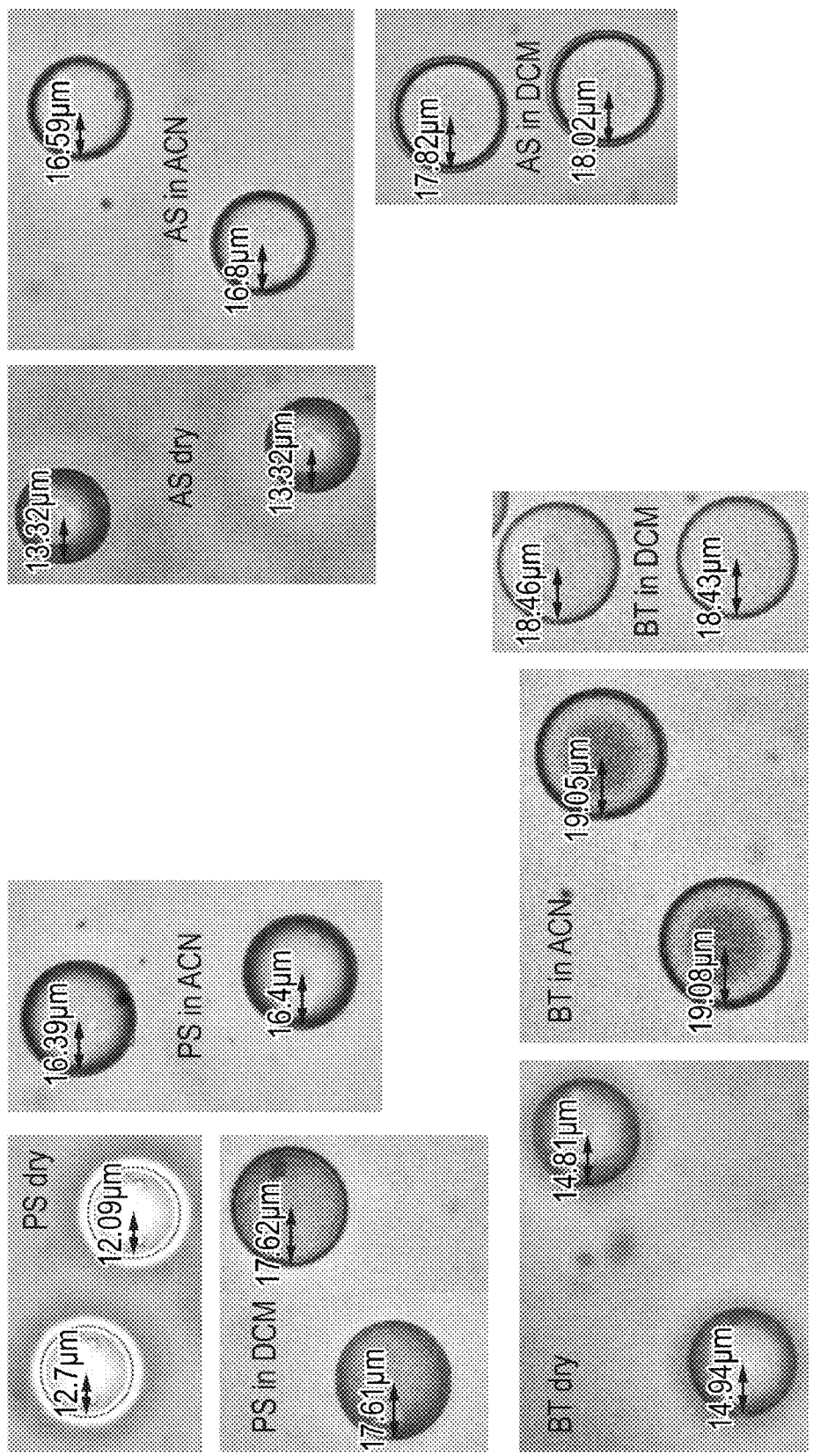
FIG. 9 shows microscopic images of Boc-TOTA (BT), polystyrene (PS) and aminostyrene (AS) particles before (dry) and after swelling in acetonitrile (ACN) and dichloromethane (DCM).

The volume increase of the various supports was determined under a light microscope after dissolving a pinch of the particles in 200 µl of either ACN or DCM and allowing them to swell for 30 seconds. The radius of individual particles in each sample was measured using a Axio Imager.M2 microscope (Zeiss, Germany) with a LD EC Epiplan-Neofluar 50x/0.55 HD DIC M27 objective (Zeiss, Germany) (Bright Field) on AxioVision (Zeiss, Germany) and compared to "dry" particles levigated between two glass slides (FIG. 9).

Average particle swelling volume as determined from two particles per microscope sample are indicated in Table 10 and were found to be within a range of 1.9 to 2.9 for all supports. Whereas PS supports showed a 2.9 fold volume increase in DCM, BT particles were only swelling by 1.9 fold in this commonly used detritylation solvent. Furthermore, the swelling volume of Boc-TOTA particles varied less for the two tested solvents than the swelling volume of PS and AS particles, respectively, which allows for a more accurate calculation of maximum column loading. A smaller variance in swelling volume leads to a more constant back pressure which is associated with even flow rates during oligonucleotide synthesis when using a high pressure-based synthesizer. On the other hand, a smaller variance in swelling volume limits the onset of overpressure when using a pump-based oligonucleotide synthesizer.

TABLE 10

Swelling results for polystyrene, aminostyrene and Boc-TOTA particles

| Support | solvent | radius [µm] | swelling volume [m³ × 10⁻¹⁵] | x-fold volume increase |
|---|---|---|---|---|
| PS | dry | 12.4 | 7.98 | |
| | ACN | 16.4 | 18.47 | 2.3 |
| | DCM | 17.6 | 22.83 | 2.9 |
| 4% AS | dry | 13.3 | 9.85 | |
| | ACN | 16.7 | 19.50 | 2.0 |
| | DCM | 17.9 | 24.01 | 2.4 |
| 4% BT | dry | 14.8 | 13.57 | |
| | ACN | 19.1 | 29.17 | 2.1 |
| | DCM | 18.4 | 26.08 | 1.9 |

The invention claimed is:

1. Porous cross-linked polymer particles comprising a polymer formed from:
   at least one monovinyl monomer selected from a monovinyl styrene monomer and a monovinyl acrylate monomer;
   at least one polyvinyl polymer selected from a polyvinyl styrene monomer and a polyvinyl acrylate monomer; and
   at least one monomer of formula (I):

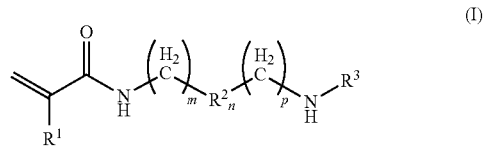

wherein:
   $R^1$ is selected from —H, —CH₃ and —CH₂CH₃;
   $R^2$ is selected from —OCH₂CH₂— and —OCH₂CH₂CH₂— or a combination thereof;
   $R^3$ is selected from —H, a protecting group and a linker;
   m is selected from 2, 3 or 4;
   n is an integer selected from 2 to 30; and
   p is selected from 0, 1 and 2,
   wherein the monomers are present in the following relative amounts:
   at least one monovinyl monomer in an amount of from 20-89 wt %;
   at least one polyvinyl monomer in an amount of from 10-60 wt %; and
   a monomer of formula (I) in an amount of from 1-20 wt %,
   wherein the polymer particles are monodisperse, wherein the at least one monovinyl monomer is a styrene monomer.

2. The polymer particles of claim 1, wherein the at least one polyvinyl monomer is a divinyl or a trivinyl monomer.

3. The polymer particles of claim 1, wherein $R^3$ comprises a combination of a protecting group and a linker.

4. The polymer particles of claim 3, wherein the protecting group is selected from tert-butyloxycarbonyl (Boc), carbobenzyloxy (Cbz), p-methoxybenzyl carbonyl (MeOZ), 9-fluorenylmethyloxycarbonyl (FMOC), acetyl (Ac), benzoyl (Bz), benzyl (Bn), carbamate, p- methoxybenzyl (PMB), 3,4-dimethoxybenzyl (DMPM), p-methoxyphenyl (PMP), and trichloroethyl chloroformate (Troc).

5. The polymer particles of claim 1, wherein the coefficient of variation (CV) is less than 10%.

6. The polymer particles of claim 1, wherein the monomers are present in the following relative amounts:
   at least one monovinyl monomer in an amount of from 50-78 wt %;
   at least one polyvinyl monomer in an amount of from 20-40 wt %; and a monomer of formula (I) in an amount of from 2-10 wt %.

7. The polymer particles of claim 1, wherein the at least one monovinyl monomer is styrene.

8. The polymer particles of claim 5, wherein the CV is less than 5 %.

9. Porous cross-linked polymer particles comprising a polymer formed from:
  at least one monovinyl monomer selected from a monovinyl styrene monomer and a monovinyl acrylate monomer;
  at least one polyvinyl polymer selected from a polyvinyl styrene monomer and a polyvinyl acrylate monomer; and
  at least one monomer of formula (I):

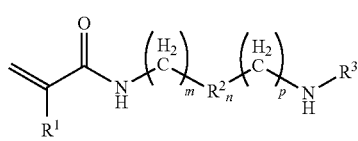

(I)

wherein:
$R^1$ is selected from —H, —$CH_3$ and —$CH_2CH_3$;
$R^2$ is selected from —$OCH_2CH_2$— and —$OCH_2CH_2CH_2$— or a combination thereof;
$R^3$ is selected from —H, a protecting group and a linker;
m is selected from 2, 3 or 4;
n is an integer selected from 2 to 30; and
p is selected from 0, 1 and 2,
wherein the monomers are present in the following relative amounts:
  at least one monovinyl monomer in an amount of from 20-89 wt %;
  at least one polyvinyl monomer in an amount of from 10-60 wt %; and
  a monomer of formula (I) in an amount of from 10-20 wt %,
wherein the polymer particles are monodisperse, wherein the at least one polyvinyl monomer is divinyl benzene.

10. A method of forming porous cross-linked polymer particles, comprising:
  (i) forming an aqueous dispersion (a) of seed particles comprising an activating agent and allowing the activating agent to diffuse into the seed particles;
  (ii) contacting the dispersion (a) with a solution (b) comprising at least one monovinyl monomer selected from a monovinyl styrene monomer and a monovinyl acrylate monomer, at least one polyvinyl monomer selected from a polyvinyl styrene monomer and a polyvinyl acrylate monomer, at least one monomer of formula (I), at least one porogen, and if required at least one initiator;
  (iii) allowing the monomers to diffuse into the seed particles to form swollen seed particles; and
  (iv) activating the initiator and allowing polymerization to proceed, thereby forming protected polymer particles, wherein the monomer of formula (I) is defined as follows:

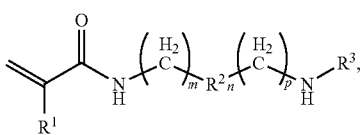

(I)

wherein:
$R^1$ is selected from —H, —$CH_3$ and —$CH_2CH_3$;
$R^2$ is selected from —$OCH_2CH_2$— and —$OCH_2CH_2CH_2$— or a combination thereof;
$R^3$ is a protecting group;
m is selected from 2, 3 and 4;
n is an in integer selected from 2 to 30; and
p is selected from 0, 1 and 2,
wherein the monomers are present in the following relative amounts:
  at least one monovinyl monomer in an amount of from 20-89 wt %;
  at least one polyvinyl monomer in an amount of from 10-60 wt %; and
  a monomer of formula (I) in an amount of from 1-20 wt %.

11. A method of forming porous cross-linked polymer particles, comprising:
  (i) forming an aqueous dispersion (a) of seed particles comprising an activating agent and allowing the activating agent to diffuse into the seed particles;
  (ii) contacting the dispersion (a) with a solution (b) comprising at least one monovinyl monomer selected from a monovinyl styrene monomer and a monovinyl acrylate monomer, at least one polyvinyl monomer selected from a polyvinyl styrene monomer and a polyvinyl acrylate monomer, at least one monomer of formula (I), at least one porogen, and if required at least one initiator;
  (iii) allowing the monomers to diffuse into the seed particles to form swollen seed particles; and
  (iv) activating the initiator and allowing polymerization to proceed, thereby forming protected polymer particles, wherein the monomer of formula (I) is defined as follows:

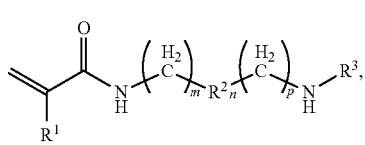

(I)

wherein:
$R^1$ is selected from —H, —$CH_3$ and —$CH_2CH_3$;
$R^2$ is selected from —$OCH_2CH_2$— and —$OCH_2CH_2CH_2$— or a combination thereof;
$R^3$ is a protecting group;
m is selected from 2, 3 and 4;
n is an in integer selected from 2 to 30; and
p is selected from 0, 1 and 2,
wherein the monomers are present in the following relative amounts:
  at least one monovinyl monomer in an amount of from 50-78 wt %;
  at least one polyvinyl monomer in an amount of from 20-40 wt %; and
  a monomer of formula (I) in an amount of from 2-10 wt %.

12. The method of claim 10, further comprising:
  (v) removing the protecting group $R_3$, thereby forming polymer particles comprising exposed amine groups.

13. The method of claim 12, further comprising:
  (vi) conjugating a linker to the exposed amine groups of the particles.

14. The method of claim 12, further comprising:
(vi) coupling a starter phosphoramidite to the exposed amine groups of the particles.

15. The method of claim 14, further comprising synthesizing an oligonucleotide on said particles.

16. A method for solid phase synthesis of nucleic acids, comprising:
providing porous cross-linked polymer particles comprising a polymer formed from:
at least one monovinyl monomer selected from a monovinyl styrene monomer and a monovinyl acrylate monomer;
at least one polyvinyl polymer selected from a polyvinyl styrene monomer and a polyvinyl acrylate monomer; and
at least one monomer of formula (I):

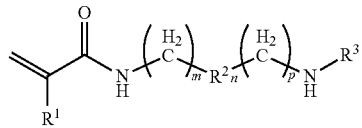

wherein:
$R^1$ is selected from —H, —$CH_3$ and —$CH_2CH_3$;
$R^2$ is selected from —$OCH_2CH_2$— and —$OCH_2CH_2CH_2$— or a combination thereof;
$R^3$ is selected from —H, a protecting group and a linker;
m is selected from 2, 3 or 4;
n is an integer selected from 2 to 30; and
p is selected from 0, 1 and 2,
wherein the monomers are present in the following relative amounts:
at least one monovinyl monomer in an amount of from 20-89 wt %;
at least one polyvinyl monomer in an amount of from 10-60 wt %; and
a monomer of formula (I) in an amount of from 1-20 wt %,
wherein the polymer particles are monodisperse in wells of a microwell plate or a microchip; and
synthesizing nucleic acids on the cross-linked polymer particle.

17. The method of claim 16, further comprising an electrochemical or photochemical deblocking step.

18. The method of claim 16, wherein the nucleic acid is synthesized at a yield of between 10 fmol and 10 pmol per particle.

* * * * *

UNITED STATES PATENT AND TRADEMARK OFFICE
CERTIFICATE OF CORRECTION

PATENT NO.      : 11,041,068 B2
APPLICATION NO. : 16/305372
DATED           : June 22, 2021
INVENTOR(S)     : Kristian Andersson et al.

Page 1 of 1

It is certified that error appears in the above-identified patent and that said Letters Patent is hereby corrected as shown below:

In the Claims

In Column 35, Claim 9, Line 38, delete "from 10-20" and insert -- from 1-20 --, therefor.

Signed and Sealed this
First Day of March, 2022

Drew Hirshfeld
*Performing the Functions and Duties of the
Under Secretary of Commerce for Intellectual Property and
Director of the United States Patent and Trademark Office*